United States Patent [19]
Coleman

[11] Patent Number: 5,598,070
[45] Date of Patent: Jan. 28, 1997

[54] OPTICAL SCANNER CONTROL SYSTEMS AND CIRCUITS

[75] Inventor: Edward P. Coleman, Fairport, N.Y.

[73] Assignee: PSC Inc., Webster, N.Y.

[21] Appl. No.: 353,411

[22] Filed: Dec. 9, 1994

[51] Int. Cl.$^6$ .......................... H02K 29/08; H02K 33/16
[52] U.S. Cl. ................ 318/127; 235/462; 310/31
[58] Field of Search ....................... 318/127, 126, 318/128, 129, 131; 310/15, 17, 20, 21, 31, 36, 37, 38, 39; 235/462, 466, 467

[56] References Cited

U.S. PATENT DOCUMENTS

| | | | |
|---|---|---|---|
| 3,883,786 | 5/1975 | McNaughton et al. | 318/317 |
| 4,153,863 | 5/1979 | Schachte | 318/341 |
| 4,471,278 | 9/1984 | Matouka | 318/561 |
| 4,508,999 | 4/1985 | Melocik et al. | 318/331 |
| 4,523,134 | 6/1985 | Kinoshita et al. | 318/313 |
| 4,600,983 | 7/1986 | Petsch | 363/63 |
| 4,628,460 | 12/1986 | Frederich | 364/480 |
| 4,661,756 | 4/1987 | Murphy et al. | 318/701 |
| 4,757,241 | 7/1988 | Young | 318/254 |
| 4,841,207 | 6/1989 | Cheyne | 388/811 |
| 4,933,620 | 6/1990 | MacMinn et al. | 318/696 |
| 4,952,011 | 8/1990 | Ishii et al. | 350/6.5 |
| 5,130,618 | 7/1992 | Pardoe | 318/114 |
| 5,200,597 | 4/1993 | Eastman et al. | 235/445 |
| 5,258,699 | 11/1993 | Grodevant | 318/685 |
| 5,281,801 | 1/1994 | Shepard et al. | 235/472 |
| 5,479,557 | 12/1995 | Ganz et al. | 388/829 |
| 5,519,301 | 5/1996 | Yoshida et al. | 318/811 |

*Primary Examiner*—Steven L. Stephan
*Assistant Examiner*—Judson H. Jones
*Attorney, Agent, or Firm*—Joseph F. Murphy

[57] ABSTRACT

A control system for a scanning motor that may operate at constant power, which has a control circuit including an H-Bridge connected across the drive coil of the motor. The control circuit operates under microprocessor control for digitally generating selected high current and a low current thresholds, which can be changed to enable the scanning motor to be operative over a large range (e.g. 3.3 v to 8 v) of supply voltage and to control the arc over which the motor oscillates and, therefore, the scan angle of an optical beam which scans a bar code. The control circuit turns the current to the drive coil on and off when the high and low thresholds are reached thereby varying the current which the motor draws which determines the scan angle and scan rate and average current draw, which may be maintained constant for constant power consumption.

11 Claims, 22 Drawing Sheets

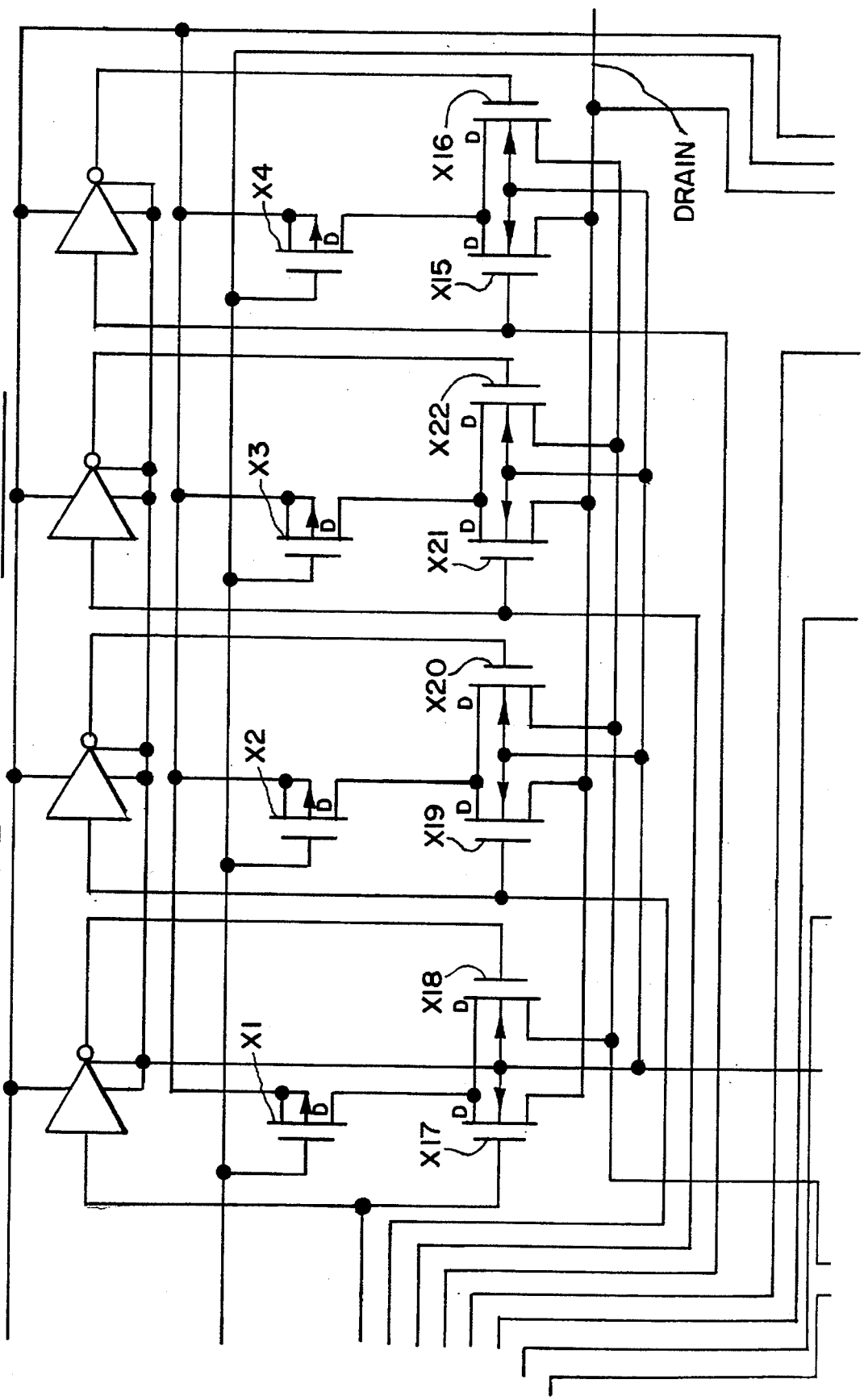

OPTICAL SCANNER CONTROL SYSTEMS AND CIRCUITS

DESCRIPTION

1. Field of The Invention

The invention relates generally to optical scanners and particularly to bar code scanning systems where an optical beam is scanned across a bar code to obtain return light from which the code can be read and deciphered. The invention provides control circuits for such optical scanners which control current which operates the scanning motor of the optical scanner for power savings and for control of scan angle of the beam and the scanning rate of the beam.

2. Background of the Invention

Bar codes have been used in a wide variety of applications as a source for information. Typically, bar codes are used at a point-of-sale terminal in merchandising for pricing and inventory control. Bar codes are also used in controlled personnel access systems, and in manufacturing for work-in process and inventory control systems, etc. The bar codes themselves represent alphanumeric characters by series of adjacent bars and spaces of various widths (e.g., in accordance with the universal product code.)

Bar code reading systems, using optical beam scanners, have been developed to read bar codes. The light beam is translated (usually oscillated repeatedly in opposite directions) across the bar code and a portion of the light illuminating the bar code, which is returned, is collected by the scanner. The intensity of the return light is related to the reflectance of the area illuminated by the laser diode, and is converted into an electric signal using a photodetector. The signal is then amplified and decoded.

A scanning motor may control the movement of an assembly including a laser which scans the laser beam across the bar code, or of a scanning mirror or other deflector which deflects the laser beam, so that the bar code may be read. It is desirable to minimize the current drawn by the motor especially when a battery is used in the scanner for portability, thereby prolonging the life of the battery or the period between recharges. Also, it is desirable to provide for normal operation (at certain scan rates and scan angles) notwithstanding that battery voltage drops or even with different supply voltage obtained from batteries or other sources (e.g. the terminal with which the scanner is used). To conserve power and minimize current draw and to minimize scanner size, it is desirable to use CMOS motor control circuitry. Sensing current drawn by the motor is required by conventional motor control circuitry, and becomes difficult to obtain without an external resistor in series with the coil of the scanning motor through which the current flows, the amplitude and direction of which is sensed. Such external resistors waste power and are not compatible with miniature, CMOS circuitry.

Reference may be had to Eastman et al. U.S. Pat. No. 5,200,597 issued Apr. 6, 1993 for a bar code scanner motor control system, and U.S. patent application Ser. No. 08/443,806, filed May 18, 1995 as a continuation of U.S. patent application Ser. No. 08/166,538 filed Dec. 14, 1993 now abandoned, and assigned to the assignee hereof, for an improvement on the bar code scanner motor control system of U.S. Pat. No. 5,200,597. Other motor control systems involve microprocessor control for regulation of motor current, but without the features needed for scanner motor control and low power drain for portable operations provided by the invention. Such motor control systems are shown in the following U.S. Pat. Nos.: Matouka, 4,471,278, issued Sep. 11, 1984; Young, 4,757,241 issued July 12, 1988; and Cheyne, 4,841,207, issued Jun. 20, 1989. The general technological background of pulse width motor current controller is found in McNaughton, 3,883,786, issued May 13, 1975; Schachte, 4,153,863, issued May 8, 1979; Kinoshita, 4,523,134, issued Jun. 11, 1985; Melocik, 4,508,999, issued Apr. 2, 1985; Petsch, 4,600,983, issued Jul. 15, 1986; Frederich, 4,628,460, issued Dec. 9, 1986; Murphy, 4,661,756, issued Apr. 28, 1987; and Ishi, 4,952,011, issued Aug. 28, 1990.

SUMMARY

The present invention overcomes the disadvantages attendant to known scanner motor circuits by providing, in accordance with an embodiment thereof, a system for controlling scanning motnor including a control circuit that can operate the motor at constant power. System includes an H-Bridge across which the drive coil of the scanner motor is connected. The bridge has switch means for controlling the current through the coil thereby controlling the arc (angle) over which the motor oscillates in opposite directions and the oscillation rate. Preferably digitally operative means under control of a computer (e.g., a microprocessor), which controls the various scanner functions, is operative for generating a high current threshold and a low current threshold. The thresholds may be changed to vary average scan current and motor acceleration to maintain desired scan rates and angles with different supply voltage. The current to the drive coil is turned on and off when the high and low thresholds are reached so that the average motor coil current may be controlled, thereby achieving the desired scan angles and rates and constant power consumption.

The control circuit is provided as a mixed mode digital/analog circuit implemented, in a preferred embodiment, in CMOS FETS. The apparatus of the invention turns the current to the motor coil on when the low threshold corresponds to the coil current, and off when the coil current increases to correspond to the high threshold. The microprocessor is used to generate two, multi-bit bytes. One of these bytes represents the high threshold and the other represents the low threshold. These bytes may be set to fixed values or varied to keep average current constant or to change the average current. This can be done to change the scan angle to obtain any desired scan angle or length for the light beam which scans the bar code.

The H-Bridge controls the direction of current flow through the motor coil, e.g. opposite directions, A or direction B, for controlling motor oscillation and scan directions. The direction of current flow on each start of scan and can be preset to start in either the A direction or in the B direction. The motor current control turns the current to the motor coil on and off when the high and low thresholds are reached. The current in the coil does not stop when it is switched on and off because of the inductive reactance of the coil (L/R-time constant where L is the inductance and R is the internal resistance of the coil and components in the H-bridge, connected thereto). However, the average current through the coil can be changed by setting the high and low thresholds.

BRIEF DESCRIPTION OF THE DRAWINGS

FIG. 13, 13A, 13B, 13C and 13D is a schematic diagram of the thresel circuit 47 of FIG. 2 in greater detail.

DETAILED DESCRIPTION

Figure 1:
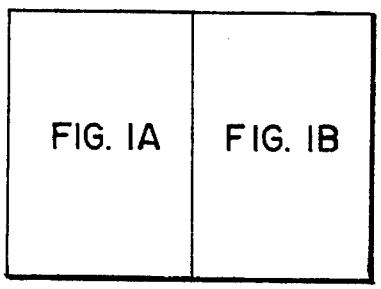
FIG. 1, 1A & 1B is a block diagram schematically showing a scanner motor control system embodying this invention.

Referring now to the drawings in detail and more particularly to FIG. 1, there is shown an assembly 11 of the laser and the collector optics of a scanner, such as shown in Eastman, et al. U.S. Pat. No. 5,015,831 issued May 14, 1991 or U.S. Pat. No. 5,115,120, issued May 19, 1992 or in U.S. patent application 08/375,216 filed Jan. 19, 1995 (continuation of 07/985,371 filed Dec. 4, 1992, PCT-Publication WO 9414136 of Jun. 23, 1994) and U.S. Pat. No. 5,422,472 issued Jun. 6, 1995, all assigned to the assignee hereof. The assembly 11 has a scanning mirror such as shown in Eastman et al., U.S. Pat. No. 5,200,597 issued Apr. 6, 1993 is mechanically coupled to coil 12 of motor 13. The coil 12 may be a stator coil of a D.C. stepper motor, the shaft of which is connected to a scanning mirror as in U.S. Pat. No. 5,200,597. The coil 12 may be flexurally mounted for oscillating with a laser and collection optics or as in U.S. Pat. Nos. 5,015,831 or 5,115,120 or W0914136 all referenced above, and in U.S. patent application Ser. No. 08/332,205, filed Oct. 31, 1994 in the name of J. Eastman and A. Quinn and assigned to the assignee hereof. The coil 12 may be magnetically coupled to permanent magnets which provide the motor for driving the assembly 11. Coil 12 is capable of receiving current that has a direction A and a direction B (opposite current flow directions through the coil). One of the ends of coil 12 is connected to one of the sides of H-Bridge 14 and the other end of coil 12 is connected to the opposite side of H-Bridge 14 in H-Bridge system 106. The bridge 14 has four pass elements (FETS), two of which (a PFET and NFET pair) define the opposite vertical sides of the H. The coil 12 is connected between the junctions of the pass elements. When current having direction or phase A is transmitted to coil 12 from H-Bridge 14, the current will travel in the direction indicated by arrow A and the assembly 11 will rotate in the direction indicated by arrow A'. When current having direction or phase B is transmitted to coil 12 from H-Bridge 14, the current will travel in the direction indicated by arrow B and assembly 11 will rotate in the direction indicated by arrow B'. Thus, assembly 11 may be driven positively in both directions A' and B'. The laser beam can scan an object, such as a bar code.

A microprocessor computer (micro) 16 writes two eight bit words (bytes) through the ESPI 17 interface that sets high and low current limits or thresholds, in latches 101 and 102 respectively defining the average current for coil 12, as the current oscillates between the two current limit values. All of the microprocessor outputs and inputs, including the thresholds are supplied to the circuits of the system via the serial interface ESPI 17 which writes and reads latches 101 and 102, and 103 storing the microprocessor outputs and updating them as new outputs are provided by the microprocessor. An internal bus also including latches may also be used. A suitable bus is the SPI data bus. The ESPI is similar to the SPI, serial peripheral interface, which may be built into the micro 16 and is described in Motorola Technical Data HC05 for the Motorola MC68HC70568 microprocessor. The mode or direction (also called phase herein) that is selected is a function of the level at an input to the H-Bridge System 106, which is the ABSEL command to HN controller 18. If the state of ABSEL is high, H-Bridge 14 is set to the A phase. Then H-Bridge 14 is transmitting current to coil 12 in direction A while a digitally controlled current comparator 15 is looking for the high threshold. As soon as the high threshold is reached, H-Bridge 14 will be turned off and the comparator 15 then will be looking for the low current threshold. The current is similarly switched on and off when current flows in the B direction. The current direction A or B is switched via the bridge 14 at the end of a scan (sometimes called a frame) or the start of the next scan in the opposite direction (SOS or start of scan) so that the assembly 11 oscillates back and forth, scanning the light beam in opposite directions across the bar code to be read. The current waveform and the direction of current flow in the coil for the A & B phases of the oscillations of the assembly 11 will be more apparent from FIG. 3.

Figure 2:
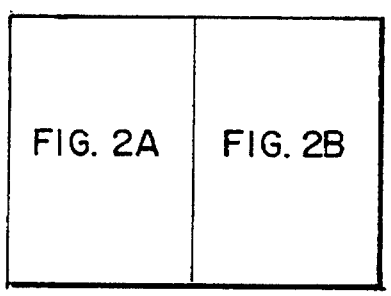
FIG. 2, 2A & 2B is a more detailed schematic block diagram of the H-bridge system 106 of FIG. 1, showing some of the other circuits of the system shown in FIG. 1 in greater detail.

The ABSEL (phase or directional) input to H-Bridge 106 is applied to the HB controller 18, shown as the hbmux in FIG. 2, and determines whether the current traveling through H-Bridge 14 to coil 12 will travel in direction A or direction B. When H-Bridge 14 receives a directional input and ENA-h is high, H-Bridge 14 turns on and current begins to increase through the coil 12. The $I_L$ (current through 13 coil L) of H-Bridge 14, taken across low side pass elements which are conducting and presented as voltages, either VILA or VILB, is coupled to inputs of the digitally controlled current comparator 15. Digitally controlled current comparator 15 senses when $I_L$ reaches the high threshold current and when $I_L$ decays to the low threshold current. The voltage across different pass elements (FETS 42 and 43, FIG. 2), in opposite sides of the H-Bridge, is used to monitor $I_L(A)$ and $I_L(B)$ or VILA and VILB thereby avoiding the need for a power draining monitor resistors in series with the coil 12.

H-Bridge 14 is switched via controller 18 which outputs a plurality (e.g. 4) of bi-state levels (high or low). They set the phase A or B for the direction of the current in the coil 12 via the H-Bridge. The current is also turned on and off. Thus, the inputs to the H-Bridge 14 configure H-Bridge 14 for the direction A or B that the current will travel and turn the current on and off. For current flow in the coil in either direction (A or B), the current increases until the high threshold is reached (driven mode of operation) and then decreases until the low threshold is reached (fly back mode). When the high threshold is reached, the input to comparator 9 which is enabled to start the motor, will change state causing the P element of the H-Bridge, through which current flows to the coil, to open thereby causing the coil current to decrease to the low threshold and then turn back on. The current then again increases (the driven mode resumes) until the high threshold is reached. The coil current amplitude oscillates between high and low current at a rate determined by the coil time constant ($L/R_i$) where L is the coil's inductance and $R_i$ is its internal resistance.

Figure 3:
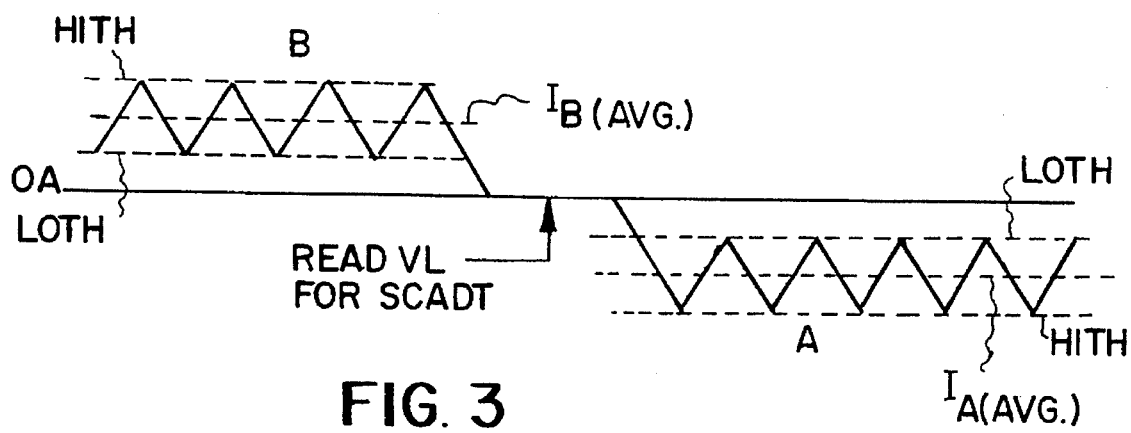
FIG. 3 is a graph of the $I_L$ output of H-Bridge 14 in FIG. 2 vs. time.

FIG. 3 shows typical amplitude oscillations and a period between switching from B to A phase. During that period while the pass elements of the bridges are all cut off the voltage, $V_L$, induced into the moving coil is detected by a scan angle detector provided by the posfb circuit 24; $V_L$ corresponding to the velocity of the assembly 11, and thus the scan angle of the beam of light. This voltage may be digitized into a byte by an analog to digital converter provided by posfb. $V_L$ is labeled VILB and VILA from H-bridge 14 of FIG. 1 depending on the direction of current flow.

H-Bridge 14 starts current flow in the proper direction, and when microprocessor 16 sends an ABSEL to the control latch 103, the H-Bridge 14 switches coil current direction. The coil draws a constant power, since the average coil current is maintained. The switching of the current will not affect the scan rate, since switching (coil current oscillation or rippling) is determined principally by L & $R_i$ and is between 10 KHz to 100 KHz (fast rate) while the scan rate is usually of the order of 15–60 scans or frames per second (a much slower rate). The inertia of the scanner assembly 11 will not allow response to fast rate signals. For example, the inductance L for coil 12 may equal approximately 1.7 millihenries and the resistance $R_i$ may be approximately 30 ohms, and gives a time constant of about 57 microseconds. The fast rate is caused by the L/R time constant of motor 13. The self oscillation frequency is determined by the L/R time constant and the high and low threshold values written to the high current threshold latch 101 and the low current threshold latch 102. This frequency is increased for high and low thresholds which are close in value, and decreased for high and low thresholds which are largely differing. Thus, the self oscillating frequency can be adjusted while maintaining the same average coil current.

The coil current is supplied from voltage supply at $V_{dd}$, which may be a battery. The power from $V_{dd}$ is controlled because the average current in the coil ($I_B$ and $I_A$ (FIG. 3)) is maintained even when $V_{dd}$ is of different amplitude (e.g. from 3.3 v to 8.0 v). However, as Vdd increases, the on time decreases in relation to the off time, maintaining constant average power draw from $V_{dd}$. If the active or current pass elements in H-Bridge 14 are running off 8 volts $V_{dd}$, to control the current at approximately 40 milliamps, there will be approximately (0.5 to 0.8) volts (VILA or VILB) across the pass elements of the bridge 14, which are transmitting current. $V_{dd}$ is presented across coil 12 when bridge is conductive. Average current is controlled by switching the bridge on and off and is maintained notwithstanding the magnitude of $V_{dd}$.

H-Bridge 14 receives an input voltage of $V_{dd}$ from power supply or battery 53 (FIG. 1). Since $V_{dd}$ may be between 3.3 and 8 volts, the bar code scanner, or other device using the system of FIG. 1, may be run at a wide range of voltages from battery or other voltage supply sources.

The switched current mode of operation of the H-Bridge 14 permits the reduction of the resistance of coil 12 to about 6 ohms if desired for power saving purposes. An example of the power saving is as follows. If the resistance of coil 12 is 30 ohms and it draws current from a 5 volt $V_{dd}$ supply, and if 40 milliamps average current is required through the coil 12, only 10 milliamps would be drawn from the $V_{dd}$ power supply. The constant power system requires only 10 milliamps of supply current to deliver 40 milliamps to the coil whereas a linear coil driver would require 40 milliamps. The foregoing values were derived as follows:

$$P_L = R_L I^2 = 30(0.04)^2 = 0.048 \text{ watts} = 48 \text{ mW}$$

$$P_{vdd} \cong 0.048, I_{vdd} \cong \frac{P_{vdd}}{V_{dd}} \cong \frac{0.048}{5} \cong 10 \text{ ma}$$

Another advantage of coil current control is that the scan angle of the laser beam from the assembly is maintained over a greater range of manufacturing tolerance for coil 12. For instance, if the resistance of coil 12 is 30 ohms and 40 milliamps is needed through coil 12 to cause assembly 11 to oscillate over a selected scan angle. This requires $P=(0.04)^2(30)=48$ mW. If the resistance of coil 12 were reduced to 10 ohms, then $P=(0.04)^210=16$ mW. This would reduce the average current draw, I, from $V_{dd}$ 53 as follows:

$$I = \frac{.048}{5} = 9.6 \text{ ma to } I = \frac{0.016}{5} = 3.2 \text{ ma}$$

The improved control circuitry permits a coil 12 having less or even more resistance to use the same average coil current, and even with a concordant power saving. The supply power is reduced by adjusting the threshold to obtain the same average current, thereby saving power. The quiescent power and switching losses were not considered in the above examples. Typically, the quiescent current is less than 1% of the H-Bridge pass element's (FETS) drive current. Switching losses can range from 1 to 25% depending on the self oscillating frequency which is controlled by setting the height low thresholds. In normal operation switching losses will be less than about 5%.

The high and low threshold data output of microprocessor 16 is coupled to the input of ESPI 17 and stored in latches 101 and 102. The high and low threshold outputs may be eight bit words (bytes). Hence, microprocessor computer 16, which generates the threshold data, controls the points of current switching in coil 12 occurs. ESPI 17 is a serial interface for serial microprocessor communication and converts serial to parallel data, which is stored in latches in the system. The ESPI 17 and latches 101 and 102 couple the microprocessor 16 to the digital amplitude and sense detector 15. Then the HB controller 18 determines the direction that current will travel in coil 12; i.e., phase A or B. After microprocessor 16 sets the direction of current in the coil and, as explained above, by setting the high and low threshold data, microprocessor 16 will transmit via the ESPI 17 an enable motor scanning signal, ENA-H to H-Bridge system 106. The above happens at to the start of scanning.

As explained above the microprocessor 16 selects phase A or B first and then switches at the end of scan on command by ABSEL to the opposite phase. Thus, the current will change from direction B to direction A on successive scans.

The outputs of H-Bridge 14 (corresponding to the current through the coil) are voltages VILA and VILB across FET pass elements 42 and 43 of the bridge which conduct when A and B drive directors are selected, respectively, and are $I_{L(A)}(RFET_A)$ and $I_{L(B)}(RFET_B)$. FET 42 is $FET_A$ and FET 43 is $FET_B$. R is the source to drain resistance of the respective FETS. Microprocessor 16 may change the high threshold eight bit word and the low threshold eight bit word to control and vary the scan angle.

As noted above, scan angle is sensed by a scan angle detector, called posfb, 23 which is enabled by RD-ANG to H-Bridge system 106. Then all the H-Bridge pass elements are set open circuit (non conductive) state, and the voltage across the coil 12, which corresponds to its velocity and therefore to the scan angle (velocity per unit time is proportional to scan angle), is detected and converted into a digital value. This value is used as the scan angle feedback control input to microprocessor 16 which may be used to control the thresholds, drive pulse locations, and the duration of the drive pulses which drive the coil. The higher the average current, the larger the scan angle.

Referring to FIG. 2, there is shown a simplified schematic diagram of the H-Bridge system 106, namely the HB controller 18 (called hbmux) and the digitally controlled current comparator 15 and drive comparator 9, which is made up of threshold selection logic 47 and comparator 50 (CMP2) and current mirror FET 51 (also called X4). The scan angle detector 23 is also shown and since it receives the velocity position feedback signal from the motor 13 coil in the H-Bridge 14, it is called posfb. The motor coil is connected between the terminals labelled coil-A and coil-B in the H-Bridge 14. The H-Bridge includes the four pass elements, two in each leg. The pass elements 40 (X1) and 42 (X3) are, respectively, P and N FETS which are conductive when current is passing through the motor coil in the A direction. The pass elements 41 and 43 are FETS which are conducting when the current is passing in the opposite direction (between the coil-B and coil-A terminals). Diodes 45 and 48 (FIG. 1) are operative on flyback to provide current paths in the A and B direction through the motor coil when the pass elements 41 and 40 are cut off. The pass elements 40 and 41 are shunted by bulk switch circuits 38 and 39 (see FIG. 4). The bulk switches act to protect the drains of 40 and 41 from exceeding Vdd. This allows the bridge circuit to operate with only two free wheeling diodes 45 and 48.

Figure 4:
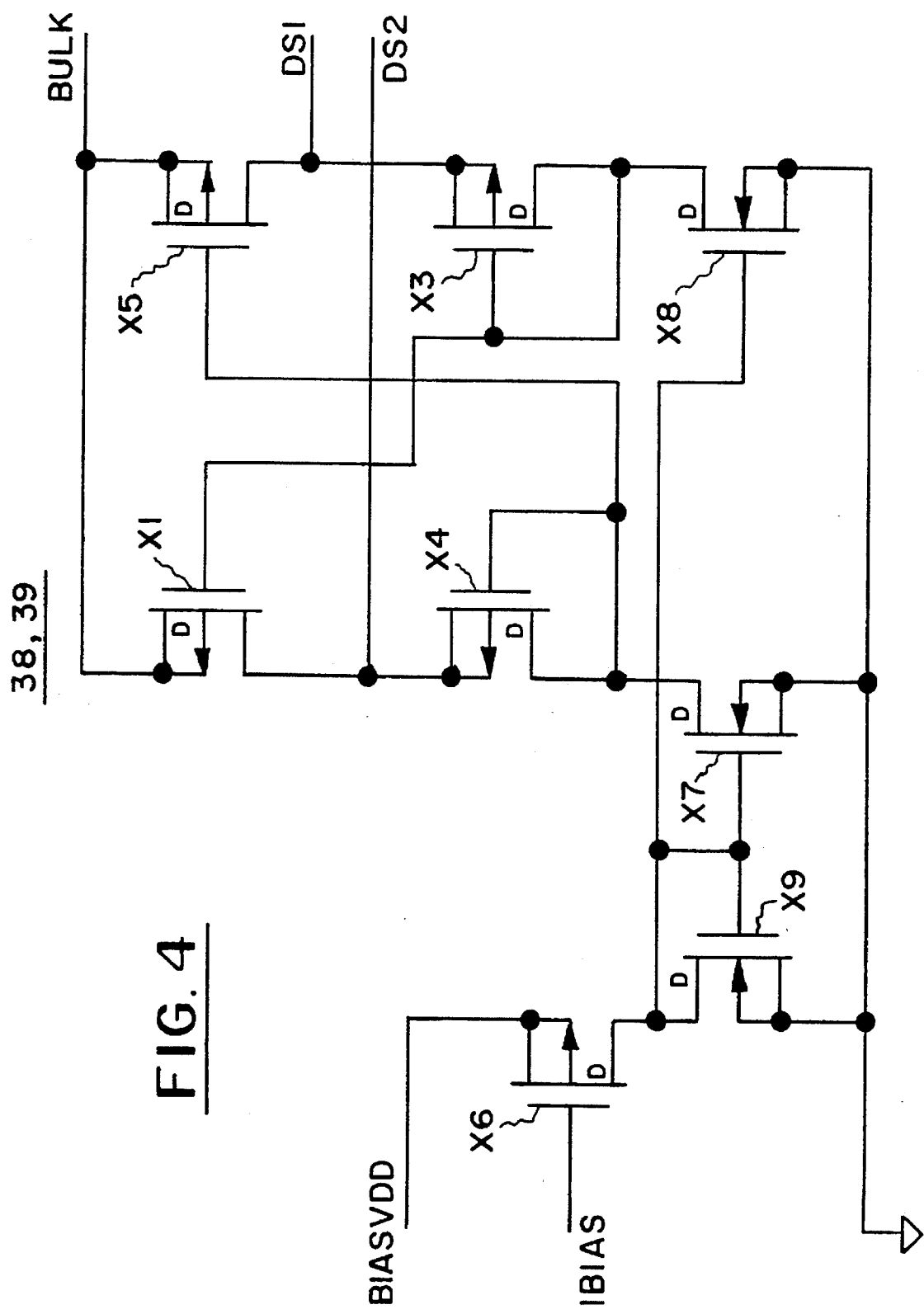
FIG. 4 is a schematic diagram of gate or bulk switch circuits, 38 and 39, of FIG. 2 in greater detail.
Figure 5:
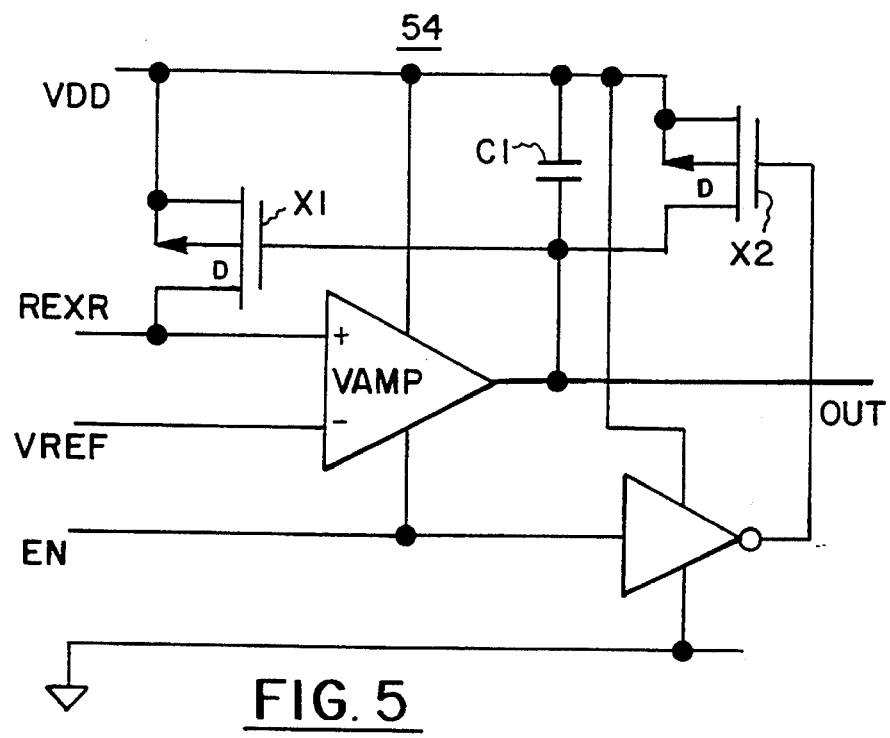
FIG. 5 is a schematic diagram of the current reference circuit, iref 54 of FIG. 1 in greater detail.
Figure 15:
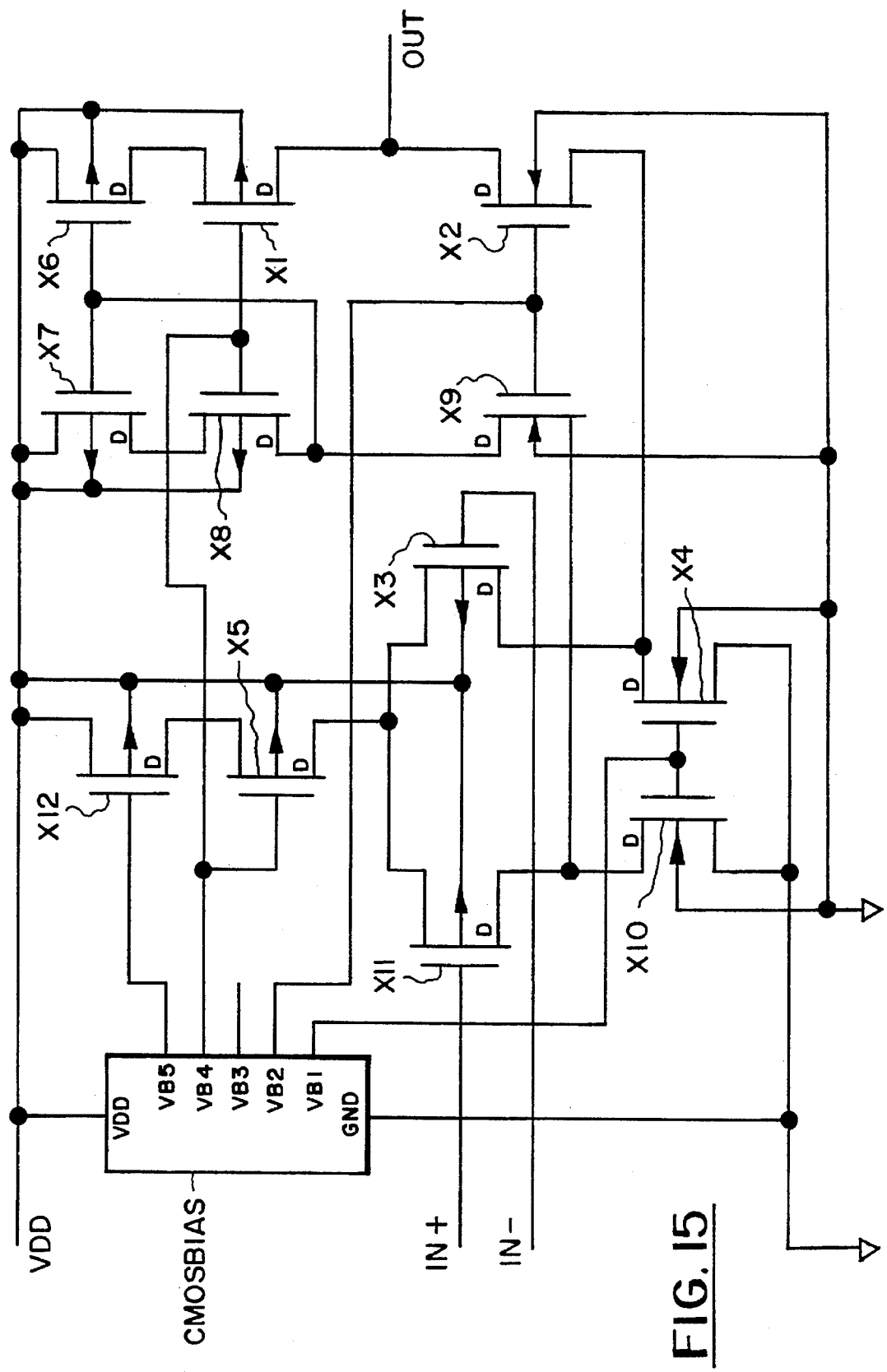
FIG. 15 is a schematic diagram showing the circuit of the operational amplifier (vamp) of FIG. 5.
Figure 16:
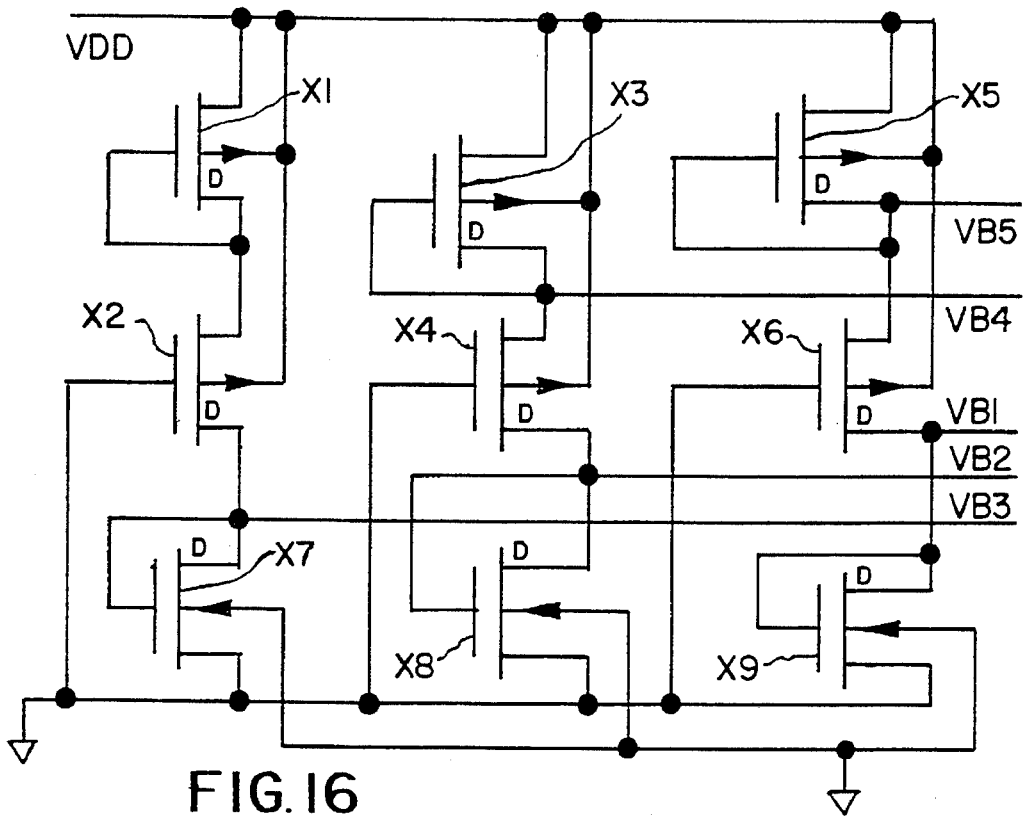
FIG. 16 is a schematic diagram of the cmos bias circuit of FIG. 15.
Figure 21:
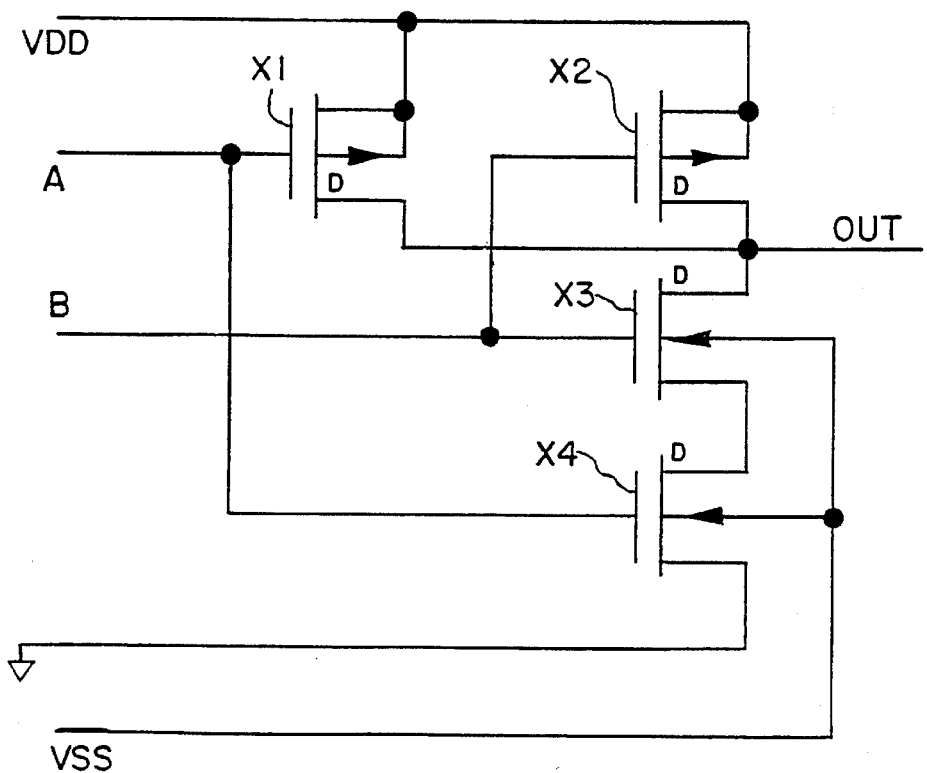
FIG. 21 is schematic diagram of the two input NAND gate, nand, of FIG. 2.

The circuits and the components of the H-Bridge system (principally CMOS FETS) are especially adapted to be implemented in a miniature integrated circuit chip. The various circuits are, for the sake of completeness, shown in detail. Specifically, the bulk switch circuits 38 and 39 are shown in FIG. 4. A current reference source 54 (FIG. 1), operated by a voltage reference such as a battery 55, is shown in FIG. 5. FIG. 15 shows an operational amplifier used in the current reference, iref 54, which amplifier is identified by the legend vamp. A CMOS bias circuit (cmosbias) which is used in vamp is shown in FIG. 16.

Figure 6:
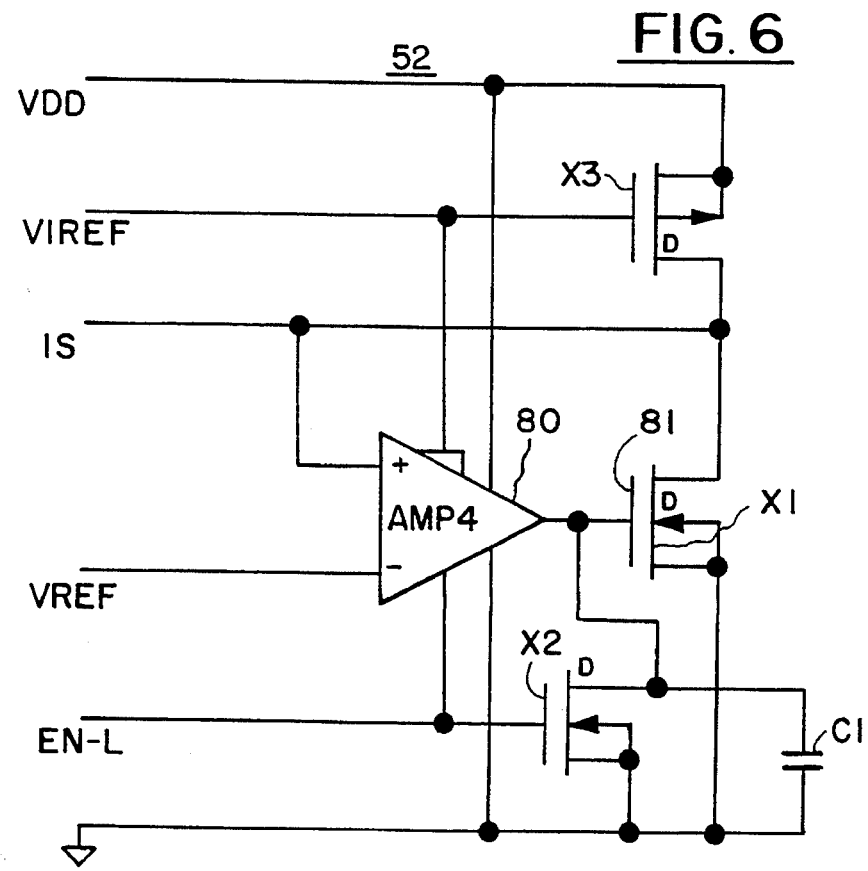
FIG. 6 is a schematic drawing of the reference buffer circuit 52 of FIG. 2 in greater detail.

FIG. 6 shows a reference buffer circuit 52, which is used in the digitally controlled current comparator 15 and is connected to the thrsel logic 47. This circuit is called rebuff 52. The refbuff circuit 52, as shown in FIG. 6, includes and operational amplifier called amp4, which may be implemented in CMOS FETS and is shown in detail in FIG. 12.

Figure 8:
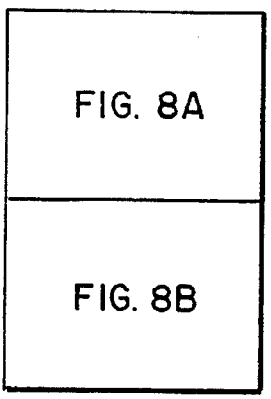
FIG. 8, 8A & 8B is a more detailed schematic diagram of the hbmux circuit 18 than is shown in FIG. 2.
Figure 7:
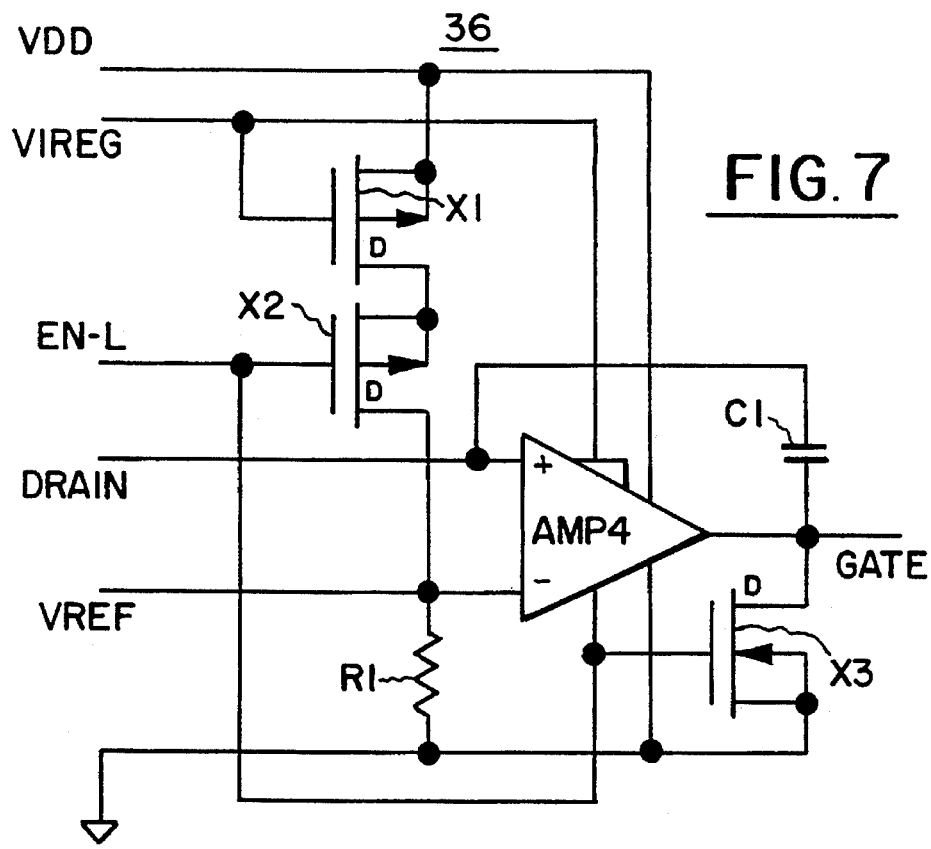
FIG. 7 is a schematic drawing of the drain-source voltage regulator circuit (dsreg) 36 which is part of multiplexer 18 of FIG. 2 as shown in greater detail in FIG. 8.

FIG. 7 is a voltage regulator circuit, which is used to regulate the voltage between the drains and sources of FETS 42 and 43 of FIG. 2. Hbmux has a driver circuit 34. All of the switches in the hbmux 18 and the driver circuits 34 and 36, thereof, are illustrated in FIG. 8. This circuit arbitrates as to the inputs provided from the microprocessor via the interface or internal databus to the control latch 103 and effects switching of current on and off for regulation and to change the current direction from A to B so as to cause the assembly 11 to oscillate.

Figure 9:
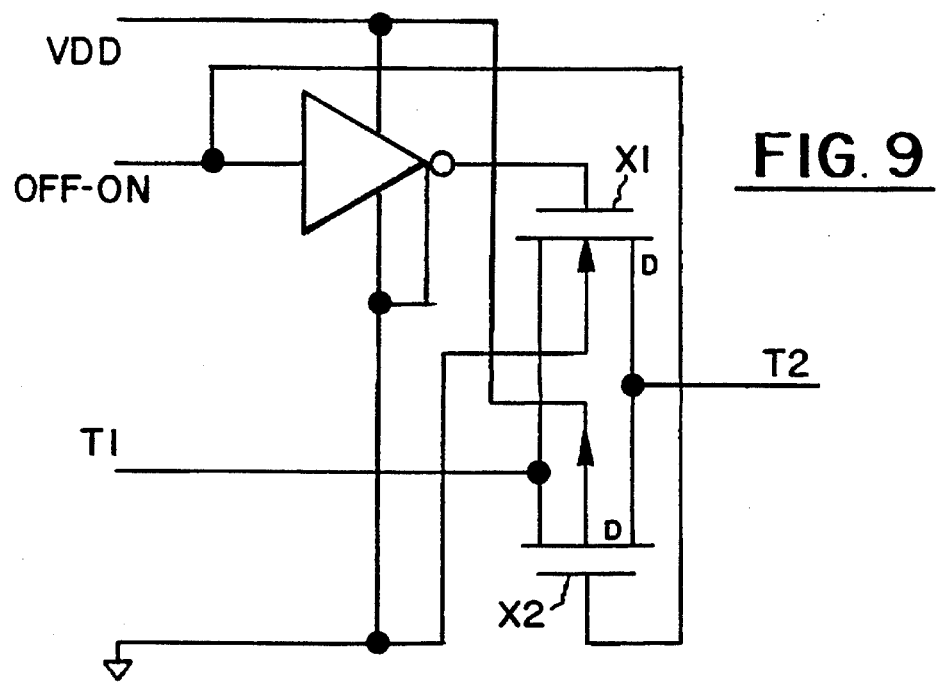
FIG. 9 is a schematic diagram of the N switch circuits 31–33 of the hbmux circuit shown in FIG. 8.
Figure 8A:
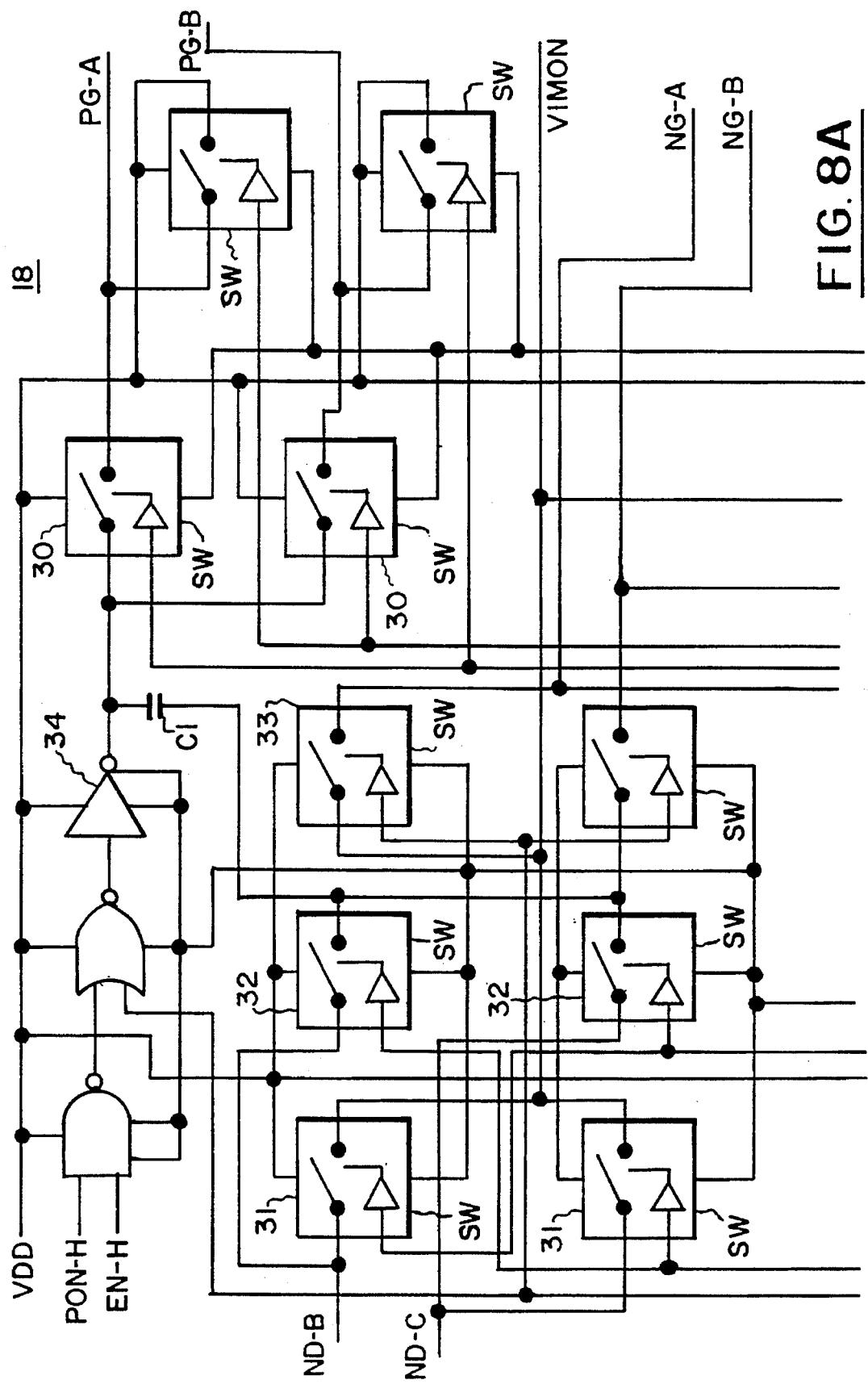
Figure 8B:
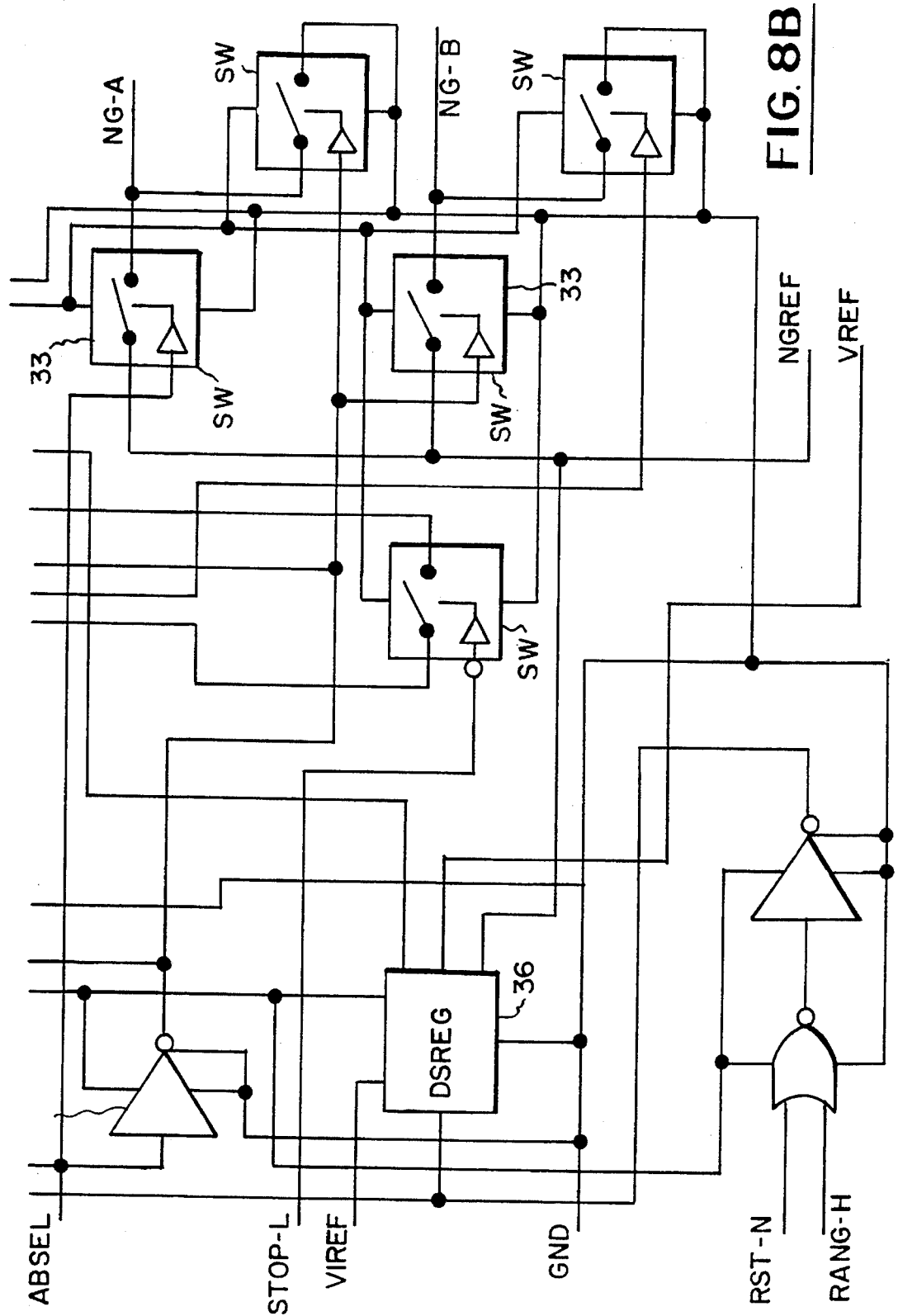
Figure 10:
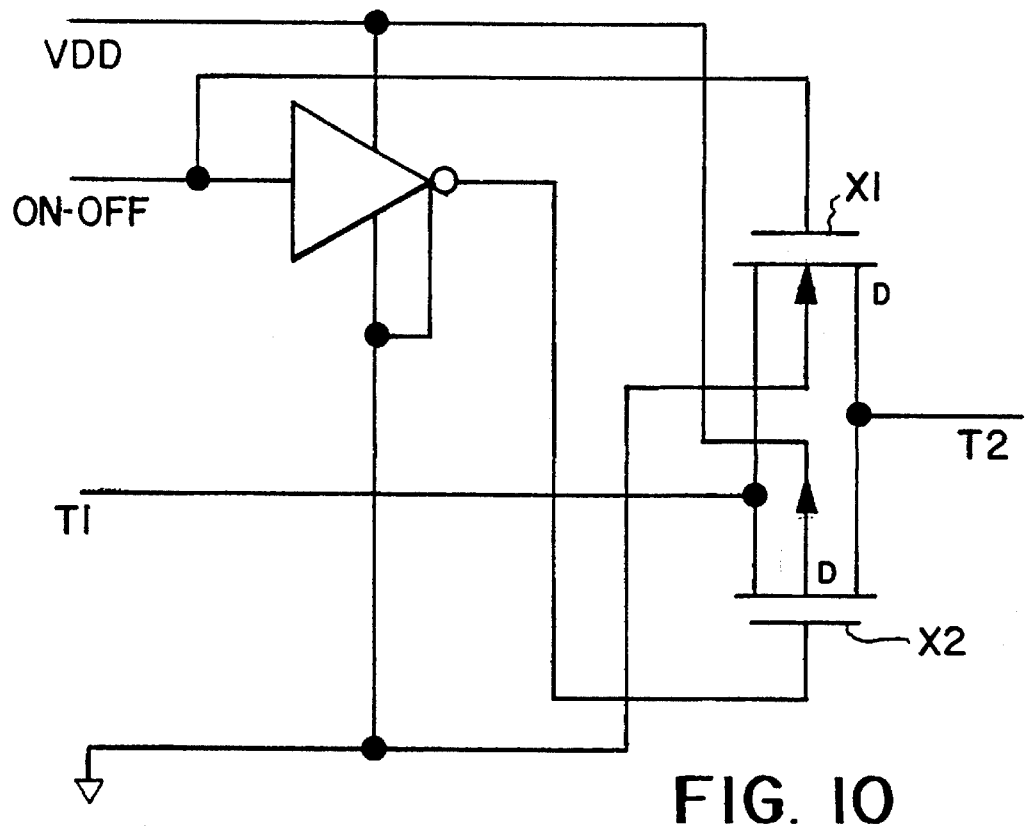
FIG. 10 is a schematic diagram of the P switch circuits 30 of the hbmux circuit of FIG. 8 and the posfb circuit 23 shown in FIGS. 2 and 17.

The dsreg circuit 36 in FIG. 8, includes the operational amplifier amp4, which is of the same design as used in the rebuff 52. The switches in hbmux are identified as "switch" and "nswitch" and differ in that the nswitch is normally closed while the switch is normally open for a logic low input. The nswitch is shown in FIG. 9 and the switch circuit is shown in FIG. 10. The hbmux and other circuits, such as iref 54 and thrsel 47, amp4 and posfb 23 use inverters which are implemented from N and P FETS and is shown in FIG. 11; the P FET being X2 and the N FET being X1.

Figure 11:
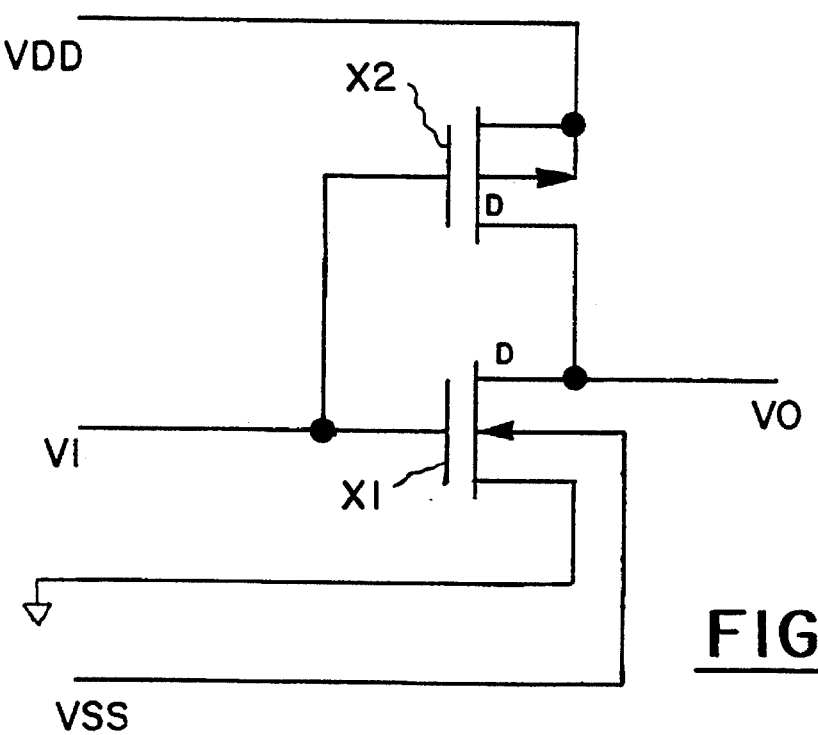
FIG. 11 is a schematic diagram of the inverter circuit which is shown in several of the schematic diagrams (FIGS. 4–17).
Figure 14:
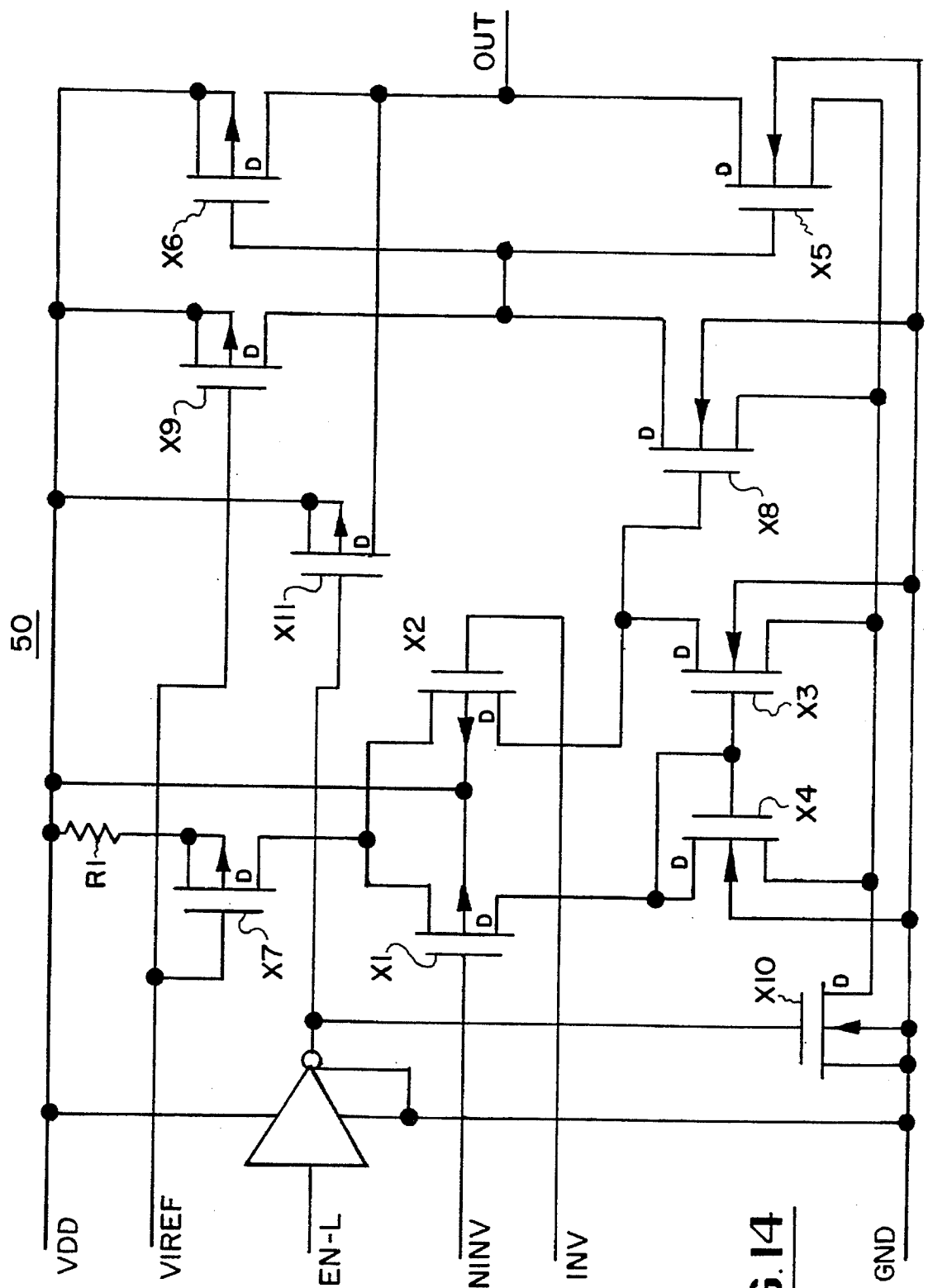
FIG. 14 is a schematic diagram showing the comparator (cmp2) 50 of FIG. 2.

The cmp2 comparator 50 also includes an inverter as shown in FIG. 11 and P and N FETS, as shown in FIG. 14.

Posfb 23 utilizes a cmp2 comparator (FIG. 14), an amp4 operational amplifier (FIG. 12), an inverter (FIG. 11) and four normally closed FET switches (FIG. 9). Several of the same inverters and several of the normally closed switches (FIG. 9) and the normally open switches (FIG. 10) are also used in thrsel 47. The pcsfb circuit 23 is shown in detail in FIG. 17.

The dsreg circuit (FIG. 7) is used to control the drain to source voltage of the n-channel pass elements 42 and 43 in the H-Bridge 14 via switches in the hbmux 18. The drain voltages VILA are sensed via a hbmux 18 switch at the drain of pass element FET 42 to detect current in the motor coil 13 (FIG. 1). Similarly, the voltage at the drain of pass element FET 43, when the current is passing through the motor coil in the B direction, is sensed via the hbmux 18 switches. The digitally controlled current comparator 15 utilizes dsreg to provide accuracy in the detection of coil current when the thresholds are reached; i.e., between the currents from thrsel 47 and the currents passing through the pass elements 42 and 43, thereby enabling the voltages across these pass elements 42 and 43 to accurately reflect the current drawn by the coil and avoiding the need for precision current sensing resistors, which would place a power draining load on the system in order to get feedback for regulating the current to the motor coil. For example, for a high threshold comparison (comparator 50 with a high output). ABSEL of 47 is high which selects the high current threshold latch 101 as the active input to thrsel 47. If IH7-IH0 are at 1,000,000 (128 decimal) the drain current at "drain" of thrsel 47 is set to 128(2.4 μA)=307.2 μA. (μA means microamps). This current times the drain-source resistance of FET 51 develops a digitally controlled threshold voltage at the non-inverting input of comparator 50. The inverting input of comparator 50 is connected to the drain of FET 42 or 43 for phase A and B coil current direction, respectively.

The voltage at the inverting input of comparator 50 is equal to the product of the coil current and the drain to source resistance of the active FET (42 for phase A or 43 for phase B). Since FET 51 is scaled 1/160 the size of FET 42 or 43, and FET 42, 43 and 51 have the same source and gate drive voltages. The drain voltages of 42, 43 and 51 will be equal, and comparator 50 will begin to change state when the current through FETS 42 or 43 is exactly 160 times the current through FET 51, or 160×307.2 μA=48.15 mA.

The data from the microprocessor through the interface for operating the system shown in FIG. 2 are the threshold select bytes (eight bit words) appear at IH0 through IH7 and are applied to the A inputs of thrsel 47. The B inputs receive IL0 through IL7. ABSEL is a discrete input (a level) to hbmux 18 that selects phase A or phase B for logic 1 or 0 respectively. ENA-H is a discrete input to hbmux 18 that enables the P channel drivers 40 and 41 of the H-Bridge 14. This allows the H-Bridge to function with only two flyback diodes D4 and D5 to discharge the motor coil during flyback (that is when the pass elements are all cut off and position detection is enabled.) RD-ANG, or Rang-H, is a discrete signal which is used for position feedback. When Rang-H is active (high state), the coil 12 is electrically released from the H-Bridge, because all of the pass elements 40 through 43 are off. This leaves the coil connected to the feedback circuit posfb 23 and enables posfb 23 for monitoring the coil voltage. This allows the coil to be monitored for polarity and amplitude to determine the scanning direction and velocity, and therefore, the scan angle of the scanning beam. The polarity position signal fbpol is an output from posfb 23 and is determined by the scan direction. By setting ABSEL in control latch 103 from the computer 16, the correct polarity can be selected for monitoring the feedback signal. Thus, if the fb signal is negative, fbpol will be in the low state. Once the fbpol bit is read, the polarity of the feedback signal can be reversed using absel and the signal amplitude can be determined. This unipolar approach doubles the resolution of the monitoring system.

RST-H is a reset pulse which is used to turn off all of the FETS 41 through 43 in the H-Bridge 14 and puts the H-Bridge in a power sleep mode drawing less than 100 nanoamps of current from Vdd. There are other circuits which also receive RST-H to place them in the sleep mode.

Figure 17:
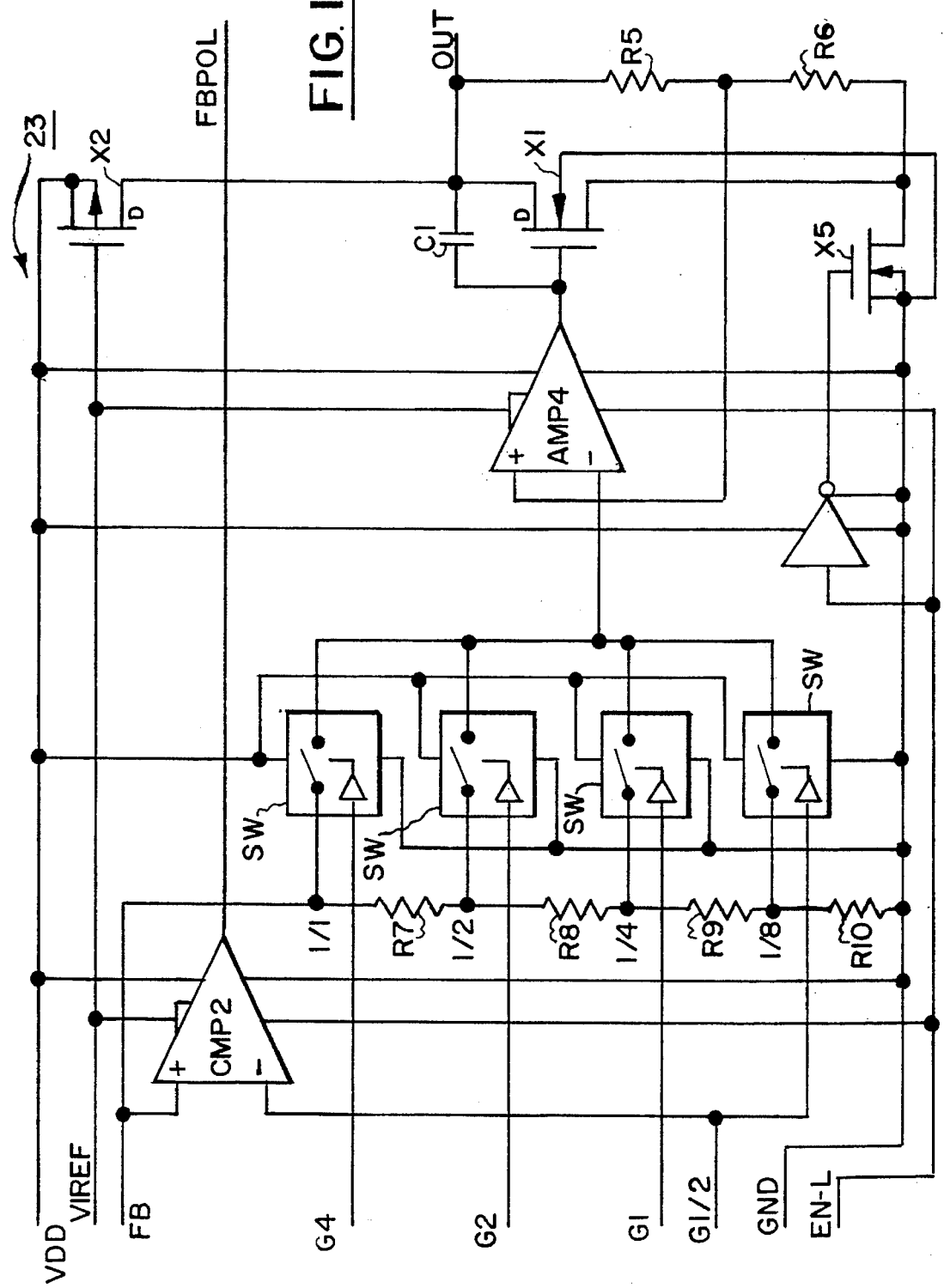
FIG. 17 is a schematic diagram of the posfb circuit 23 of FIG. 2.

FBGhalf, and FBG 1 through 4 are discrete signal levels, which control the attenuation of the back EMF signal (the voltage induced in the motor coil due to the velocity of the scanning assembly) from the coil of the motor 13 via switches in posfb 23 (see FIG. 17). The output of the comparator is fbpol. The velocity output, Vel-Out from posfb 23 ("OUT" in FIG. 17) is applied to an analog digital converter, ADC 107 FIG. 1. As mentioned above, the polarity signal is used so that the input to the ADC 107 is always positive and not saturated at ground. posfb 23 works with an inverter 112 and the nand2 gate 114. The input to the inverter is RST-H and the nand2 gate receives Rang-H from hbmux 18. Thus posfb23 is enabled by en-L from the nandgate 114 only when RD-ANG is high, and RST-H is low. The posfb circuit 23 shown in FIG. 17 uses an attenuation network (R7 thru R10), and an amplifier stage comprised of FET 116, RS, R6 and, amp4, which may have a gain of 4. This provides a choice of four gains (4,2, 1 and ½) when monitoring the back emf signal across the motor coil. This circuit presents a 192k ohm load (192 Kohms in the exemplary circuit shown herein) on the motor coil due to resistors R1 thru R4. The circuit polarity is controlled through the hbmux 18, and can be changed during a read of the back EMF. The signal fbpol will be set in the low state thereby preventing a reversed polarity signal from being interpreted as a zero velocity signal due to saturation. A 2 to 4 decoder 105 (FIG. 1) is used to select the g1/2 thru g4 inputs to reduce the gain select interface from 4 signals to 2 signals.

Figure 18:
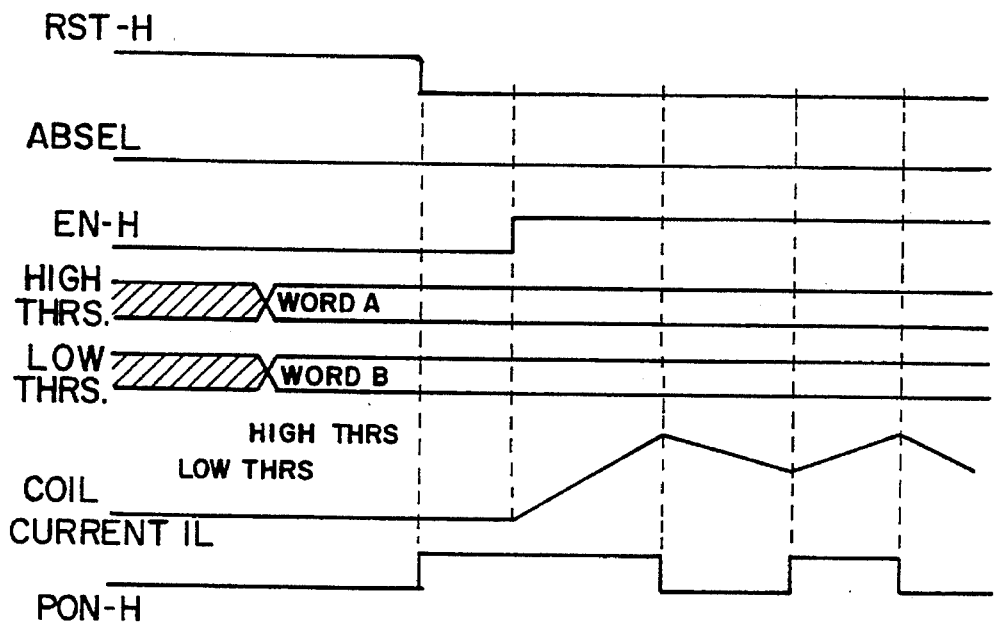
FIGS. 18, 19 and 20 are diagrams illustrating the timing of inputs and outputs in the system and circuits, shown in FIGS. 2 to 17.
Figure 20:
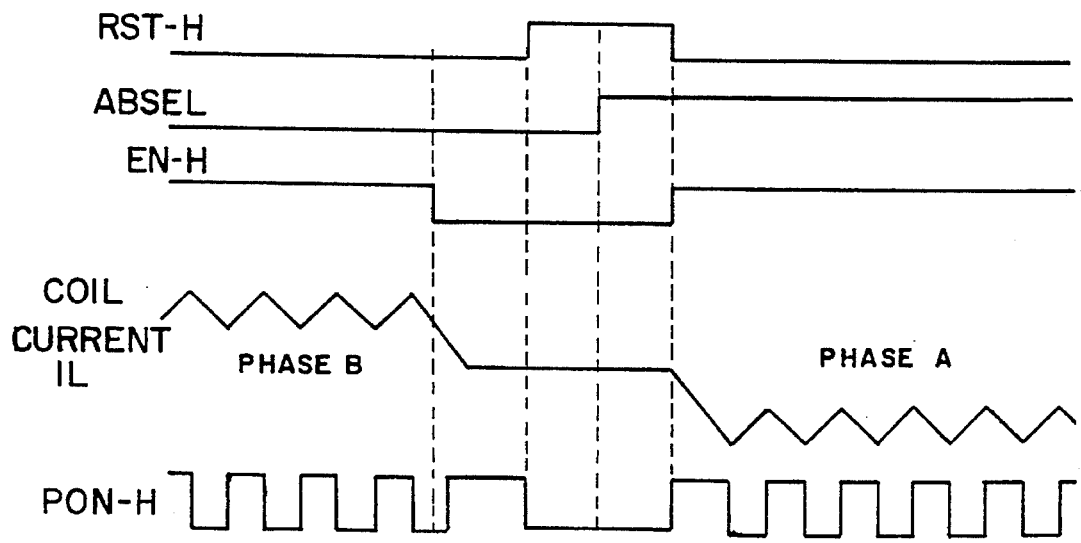
Figure 19:
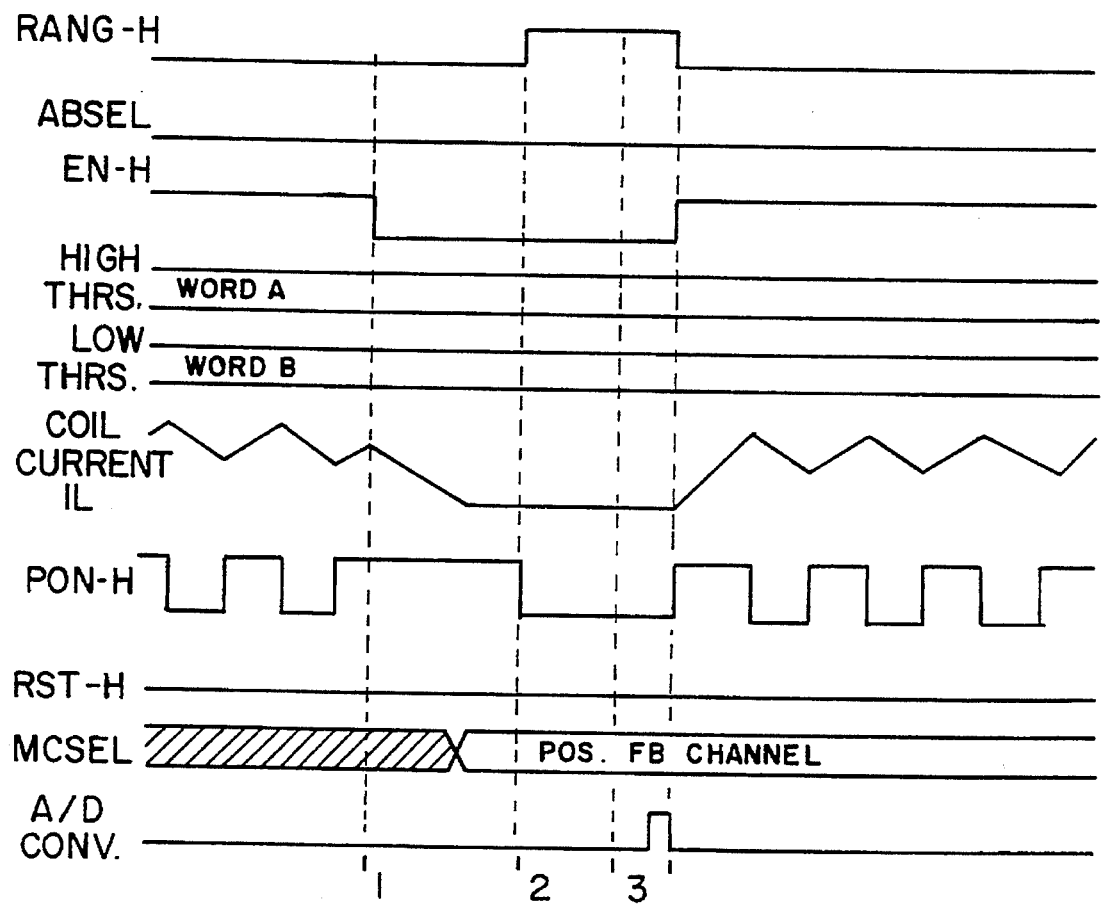

FIGS. 18, 19 and 20, respectively, show how the coil current IL varies as the various inputs and outputs vary, how the H-Bridge position feedback signal is obtained, and how the H-Bridge phase selection changes with the changes in the various inputs.

Returning to FIG. 2, it will be apparent from the foregoing, that the switches in hbmux 18 are schematically illustrated as single pole double throw (spdt switches 30, 31, 32 and 33). Effectively, these switches are each two single pole single throw switches with their fixed terminals interconnected. The switches have an A and a B state. They are shown in their A state in FIG. 2. If the switches were in their B state, each switch that is shown open would be shown closed and each switch that is currently closed would be shown open. The A and B states are selected by ABSEL.

As noted above, the H-Bridge includes gate or bulk switch circuits 38 and 39, which are shown in greater detail in FIG. 4. The pass elements are P channel or P drive FETS 40 and 41 and N channel or N drive FETS 42 and 43. The N channel FETS are bypassed by the flyback diodes 45 and 48, which are also indicated by D4 and D5, respectively. The flyback diodes 45 and 48 also protect the FETS against negative over voltages.

While single FETS are shown as the H-Bridge FETS 40 to 43, it will be appreciated that they and other FETS in the circuits illustrated herein are made up by a number, M, of parallel connected FETS in the cmos integrated circuit implementation, which may also be called an application specific integrated circuit or ASIC. The selection of M number of such FETS, W the channel width L the channel length is carried out using conventional CMOS FET design techniques.

When H-Bridge 14 is being switches from the B direction to the A direction, FET 41 is turned off first and diode 48 (D5) becomes conductive to discharge the coil 12. When the H-Bridge 14 is being switched from the A direction (phase) to the B direction (phase), FET 40 is turned off first and diode 45 (D4) becomes conductive. Then current is transmitted to ground from FET 42 through the coil of the motor to diode 45, which prevents FET 43 from being destroyed by the fly back pulse from coil 12. When H-Bridge 14 is being switched from B direction to the A direction and the P elements are turned off, diode 48 becomes conductive and functions to protect pass element 42 much like diode 45 protected pass element 43. It may be desirable to utilize diodes connected between the drains of pass elements 42 and 43 to the supply voltage source 53. Then, the flyback current may be returned to the battery to charge the battery when the energy stored in the coil is the decaying. This occurs when the high threshold is reached and the current in the coil is decreasing as shown in FIG. 3 and also in the downwardly sloping portions of the coil current waveform (IL) in FIGS. 18, 19 and 20. Switching between phase A and phase B, may occur in a quiet period of approximately 0.2 milliseconds (ms) when the coil is not being driven, and has had sufficient time to discharge. During this quiet period, the direction of movement of the coil and therefore of the assembly, may be monitored by posfb 23.

As shown in FIG. 2 and in FIG. 8, the RST-H pulse is used to reset hbmux 18 thereby turning off all of the FETS in the H-Bridge 14 and put it in a sleep mode. The enable ENA-H pulse operates the logic to the driver 34. When EN-H is in the low state, current to the H-Bridge is off. If the EN-H pulse is in the high state, the PMOS FETS 40 or 41, depending on the sate ABSEL are enabled and drive current through the coil via the H-Bridge. When ABSEL selects direction A and a low state of the EN-H pulse is present, FETS 40 and 41 will be off and FET 42 will be on, so that the current through the coil may be monitored during flyback. When monitoring the scan angle, FETS 42 and 43 are off so that the back EMF of the coil may be measured either unipolar or differentially. The configuration shown in FIG. 2 is unipolar but Fb-2 of 18 can be used with Fb-1 for differential EMF measurements. This EMF is a function of the velocity of the coil and, therefore of the assembly 11, so as to provide a signal from which the scan angle may be monitored. The velocity signal is directly proportional to the scan angle.

Figure 13:
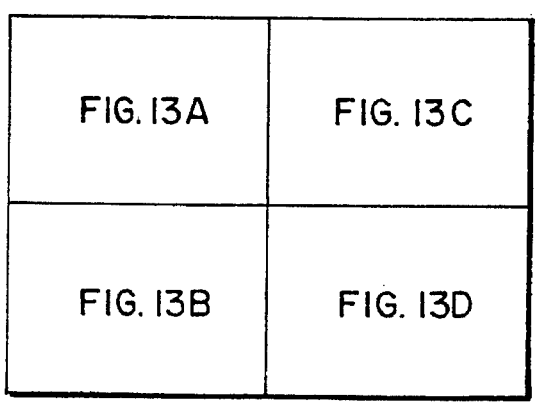
Figure 1A:
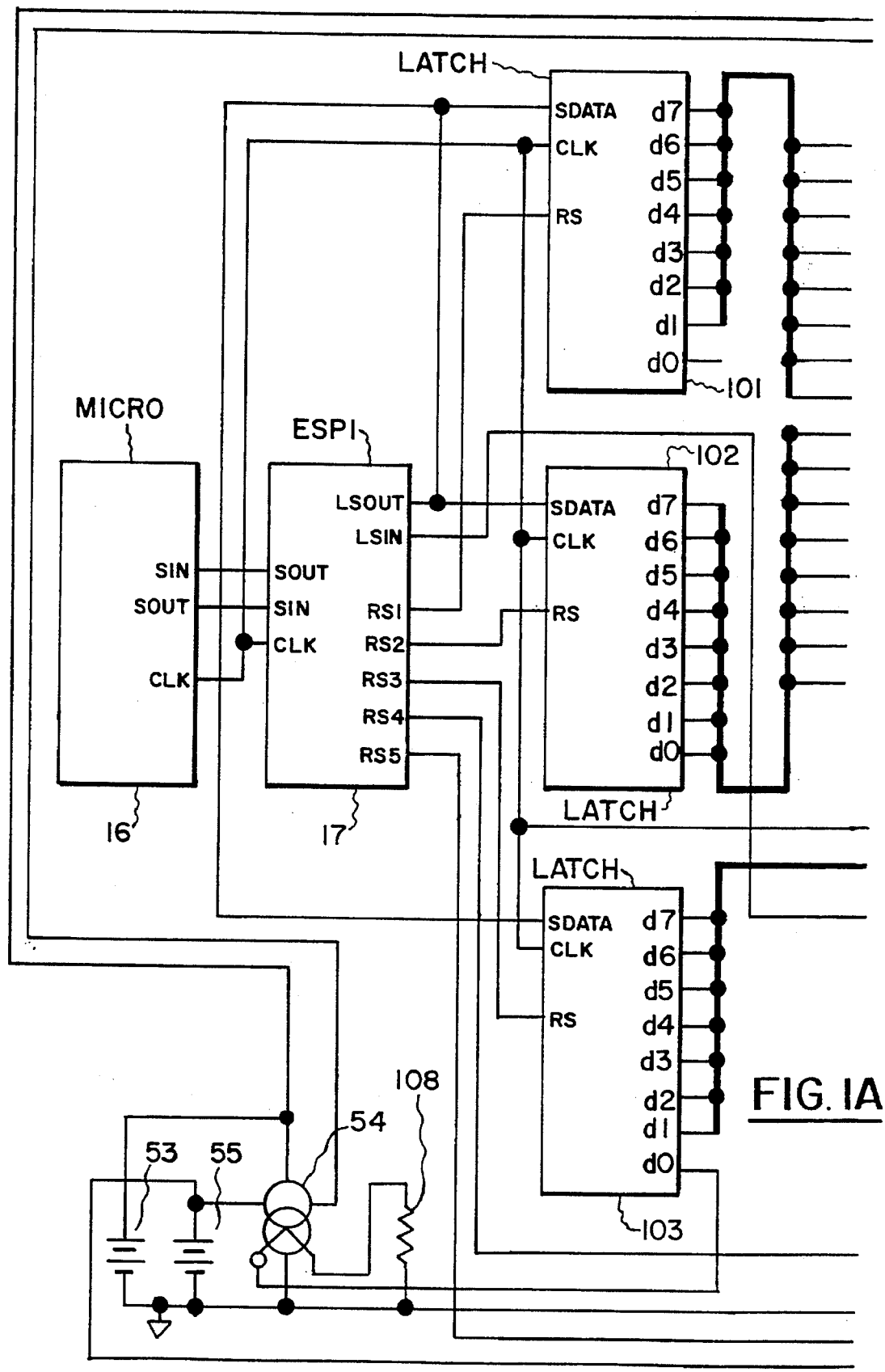
Figure 1B:
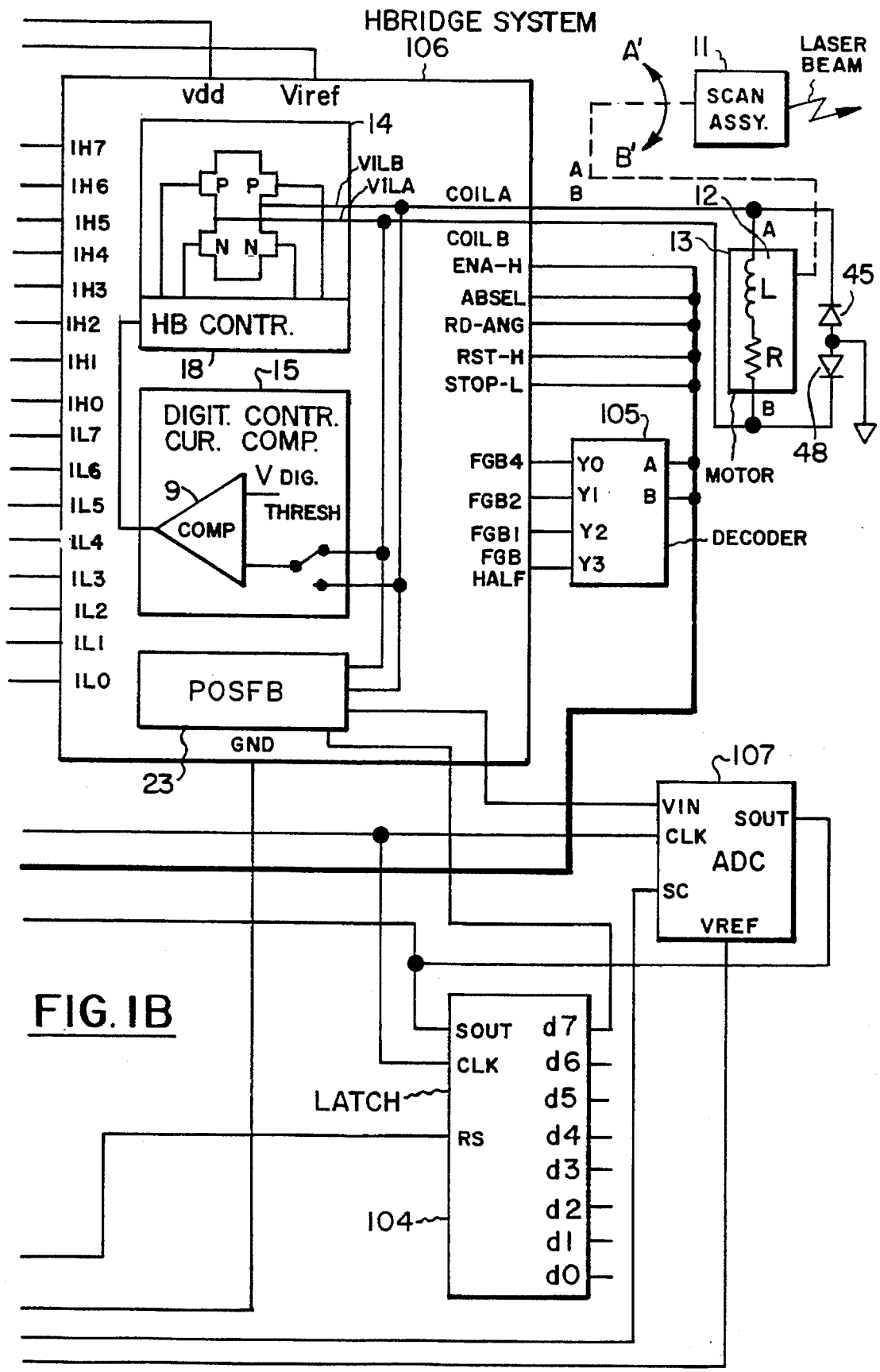
Figure 2A:
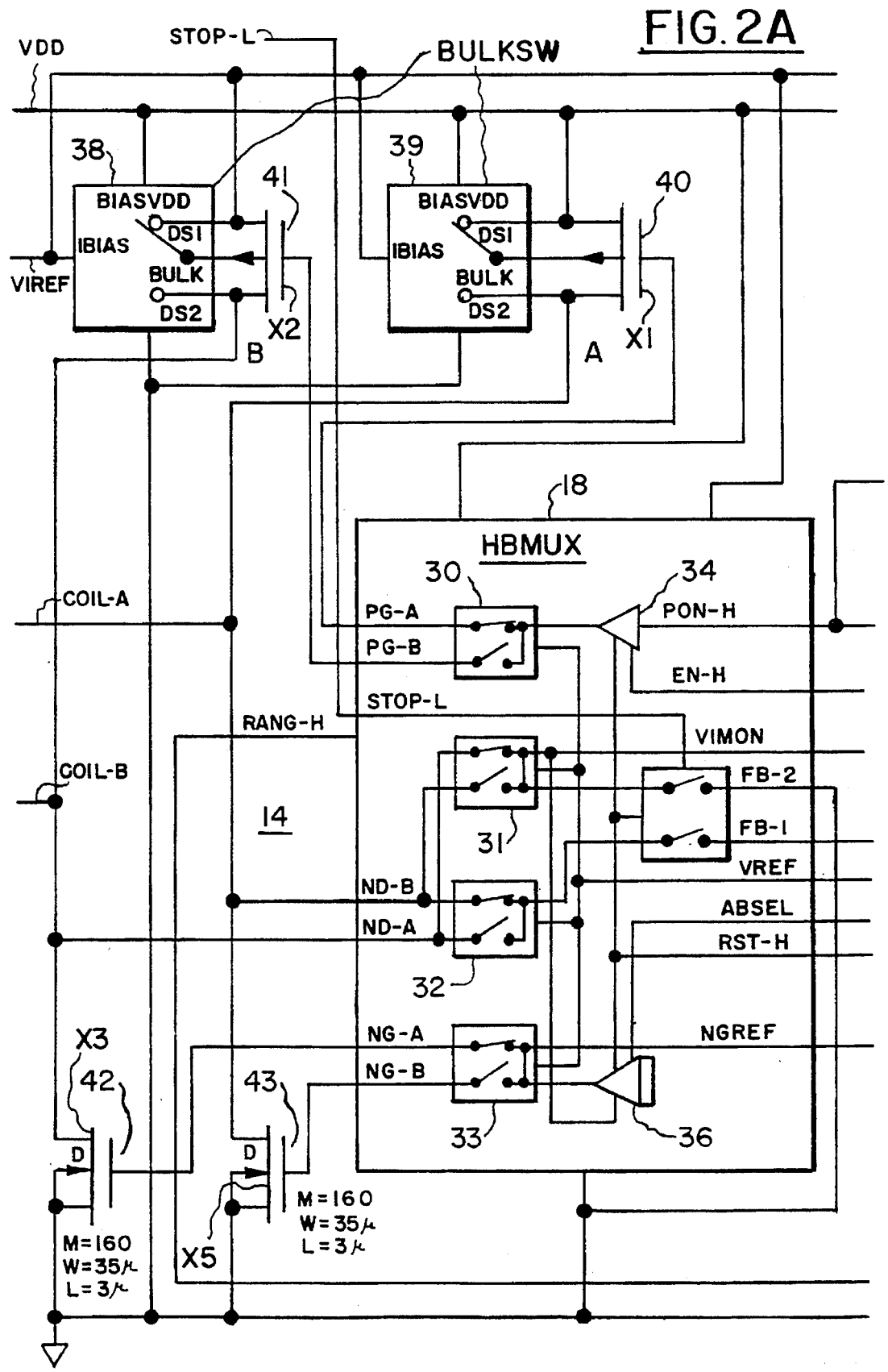
Figure 2B:
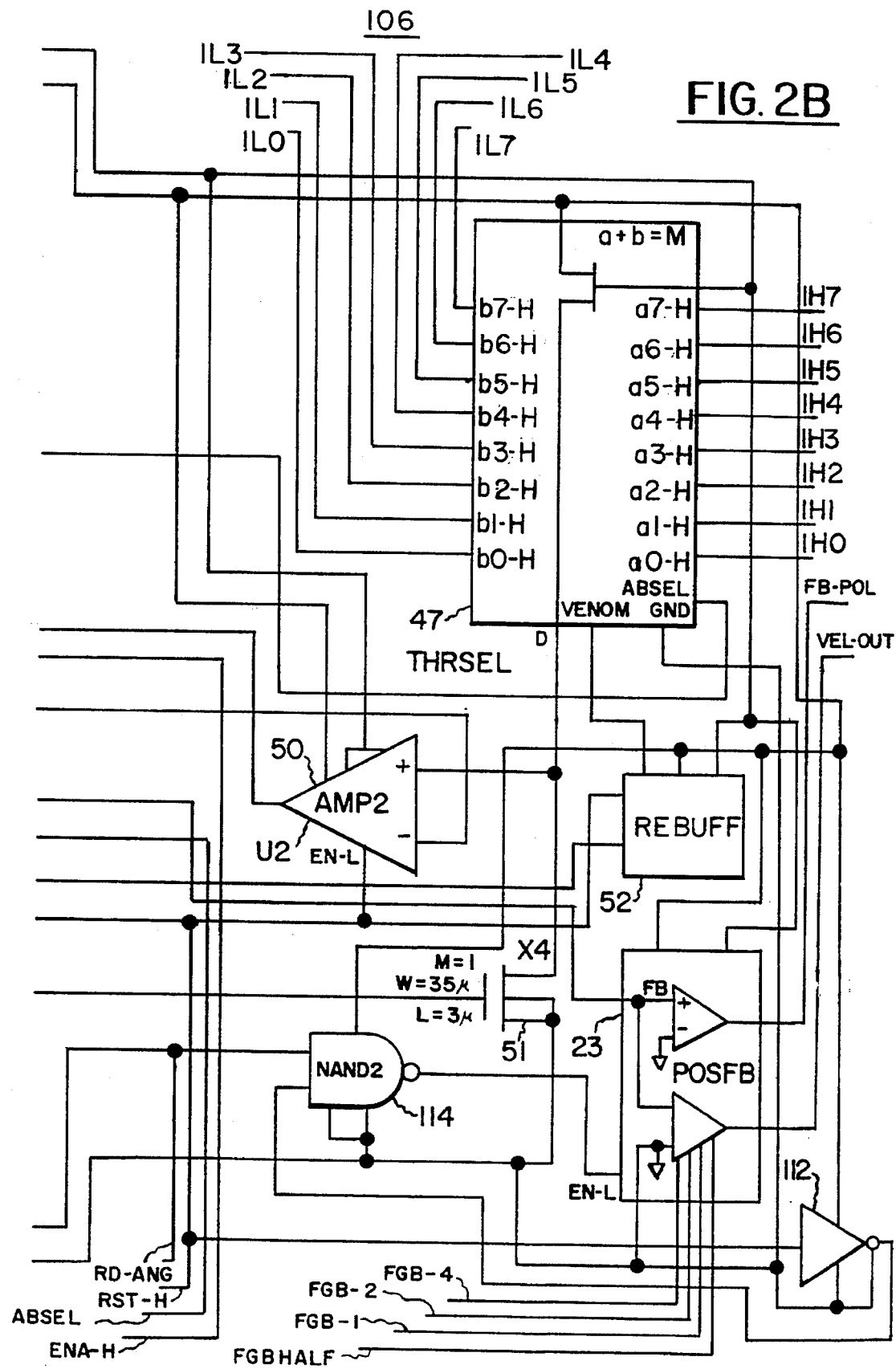

The digitally controlled current comparator 15, uses thrsel 47. Briefly, thrsel 47 is a dual port, eight bit binary weighted current reference. The two, eight bit words are provided as inputs to the circuit and are selected as the current demand using the control line absel. There are two current outputs from drain and vnom. The current at the drain output is proportional to the value of word A or word B (depending on the state of ABSEL to 47) times a constant current, for example, 2.4 microamps (ua). The current at the vnom output is (256-A) or (256-B) times the constant current. The iref gate drive voltage is used to bias current reference FETS X1, X2, X3, X4, X5, X7, X9 and X10 (see, FIG. 13). In the herein illustrated implementation, these FETS are 307.2, 153.6, 76.8, 38.4, 19.2, 9.6, 4.8, and 2.4 microamp (uA) current sources which are selected by means of X17, X19, X21, X15, X6, XS, X11 and X23, as drain outputs. Any unselected sources are provided to the vnom output. The vnom output is used to prevent the current sources from charging to Vdd when they are not in use and avoids charge buildups on the FETS and therefore also avoids potential race conditions. Race conditions can occur when the drain current from thresel 47 is switched from high current to low current threshold, and if the bias current to FETS that are not used to provide the high current threshold are left unterminated. Then the FETS can charge, which causes the threshold current to increase to sweep out the excess charge before it decreases to the low threshold. Because of vnom, the current immediately changes to the correct value without any overshoot when the threshold demand current level is switched. The circuit uses the cascade of inverters to ensure accurate threshold transitions when ABSEL changes and when the bits of the threshold control words are switched. This is accomplished by switching between threshold preferably in order from MSB (most significant bit) to LSB (least significant bit) which insures the correct polarity of hysteresis during the threshold switching.

Capacitors C1 and C2 (FIG. 13) form an AC voltage divider to the drain output to increase the hysteresis of the circuit at transitions. In effect, the thresel circuit 47 performs the logical function a or b is the threshold (M). This logical function is shown schematically in the block labelled thrsel 47 in FIG. 2.

The drive comparator 9 of FIG. 1 is implemented by the comparator 50 (cmp2) shown in FIG. 2, which is connected between thrsel 47 and hbmux 18. The comparator 50 is illustrated in detail in FIG. 14.

cmp2 50 is utilized for monitoring the current in the motor coil. The direct or noninverting (ninv) input of cmp2 50 is connected to the drain output of the current source FETS in thrsel 47. The inverting (inv) input of cmp2 50 is connected to the drain of the one of the N FETS 42 or 43, which is conducting via the switch 31 in hbmux 18. Specifically, hbmux 18 output nd-a is connected to the drain of FET 42, while output nd-b is connected to the drain of FET 43. See FIGS. 2 and 8. The inv input of cmp2 50, thus monitors the voltage drop across FET 42 or the voltage drop across FET 43 (the current flowing through the coil either in direction A or direction B times the resistance of FET 42 or FET 43). This voltage drop is the product of the coil current and the impedance of FET 42 for phase A current flow. The voltage is shown in FIG. 1 as VILA. The voltage measured across FET 43 is shown in FIG. 1 as VILB.

The voltage at the ninv input is the product of the drain current from 47 and the impedance of FET 51. FET 51 is connected as a modified current mirror to FET 42 and 43 in the H-Bridge via switch 33 depending upon the phase (phase A or phase B) of operation. The FET 51 has a much higher resistance than the FETS 42 or 43 individually. This resistance ratio may be 160 to 1. Thus, the small reference current through FET 51 produces a voltage which is compared to a voltage due to the much larger coil current which flows through FETS 42 or 43. Since FETS 42 and 43 are 160 times larger than FET 51, the smaller reference current through FET 51 is one-160th of the desired coil current at the threshold point. Unlike a conventional current mirror, the current mirror comparison provided by FET 51 and FETS 42 or 43 operates in the linear region of the FETS which enables the voltage across the H-Bridge FETS 42 or 43 to be reduced, thereby improving efficiency and enabling a large range of supply voltage (Vdd may vary from 3.3 to 8 volts) and yet enable the power drain to be minimized and facilitating miniaturization. Since power in FETS 42 and 43 is minimized, this avoids the need for large areas for heat dissipation from the H-bridge FETS. The linear operation at threshold measurements occurs because at the point where the threshold is measured, the FET 51 and the FETS 42 or 43, which is connected for the measurement have the same gate, source and drain voltages. It is at the point in time when the gate, source and drain voltages are the same, that the impedance from drain to source of FET 51 is 1/160th of the impedance from drain to source of FET 42 or 43. And this point is the threshold measurement point for comparator 50.

The output of iref 54 (FIG. 5), which is connected to the viref gate or ibias inputs to circuits 38, 39, 18, 50, 47, 52 and 23, is used to provide gate drive for current mirror FET or FETS in these circuits. This provides 2.4 µA of mirrored current per device used and provides a temperature and supply independent current source.

Driver 36 (FIG. 7) sets the reference FET 51 and FET 42 or FET 43 gate voltages. The driver 36 has a control gate drive output to FETS 42 and 43 via switch 33 that is typically about two volts. The gate voltage is controlled via dsreg 36 in FIG. 8. vnom is regulated in rebuff 52 (see also FIG. 6). This driver, dsreg (FIG. 8), controls the gate voltage on the gates of FETS 42 or 43. For example, if the drain voltage on FETS 42 or 43 decreases to below 350 millivolts, the gate drive on these FETS will decrease to set the drain of FETS 42 or 43 to 350 millivolts. Thus, the gate voltage is dynamically changed in accordance with the motor coil current. By increasing the drain voltage to 350 millivolts at full scale current level, even a 10 millivolt offset error in comparator 50 will not be significant in determining the occurrence of the threshold.

Referring to FIG. 14, the circuitry cmp2 50 will become more apparent. cmp2 50 is a differential voltage comparator composed of a differential input stage (X1, X2, X3, X7 and X4). The comparator also has sleep mode control stages X11 and X10 and an inverter U1 (see FIG. 11) for applying the enable input. There are two inverting output stages X9, X8 and X6, X5. Thus, the output of the comparator is a voltage which is proportional to the difference between the comparator input voltages at inv and niv. X7 also provides increased input impedance by providing a current source for the differential input stage. En-L enables the comparator to be turned off for sleep mode operation to obtain power conservation.

Figure 12:
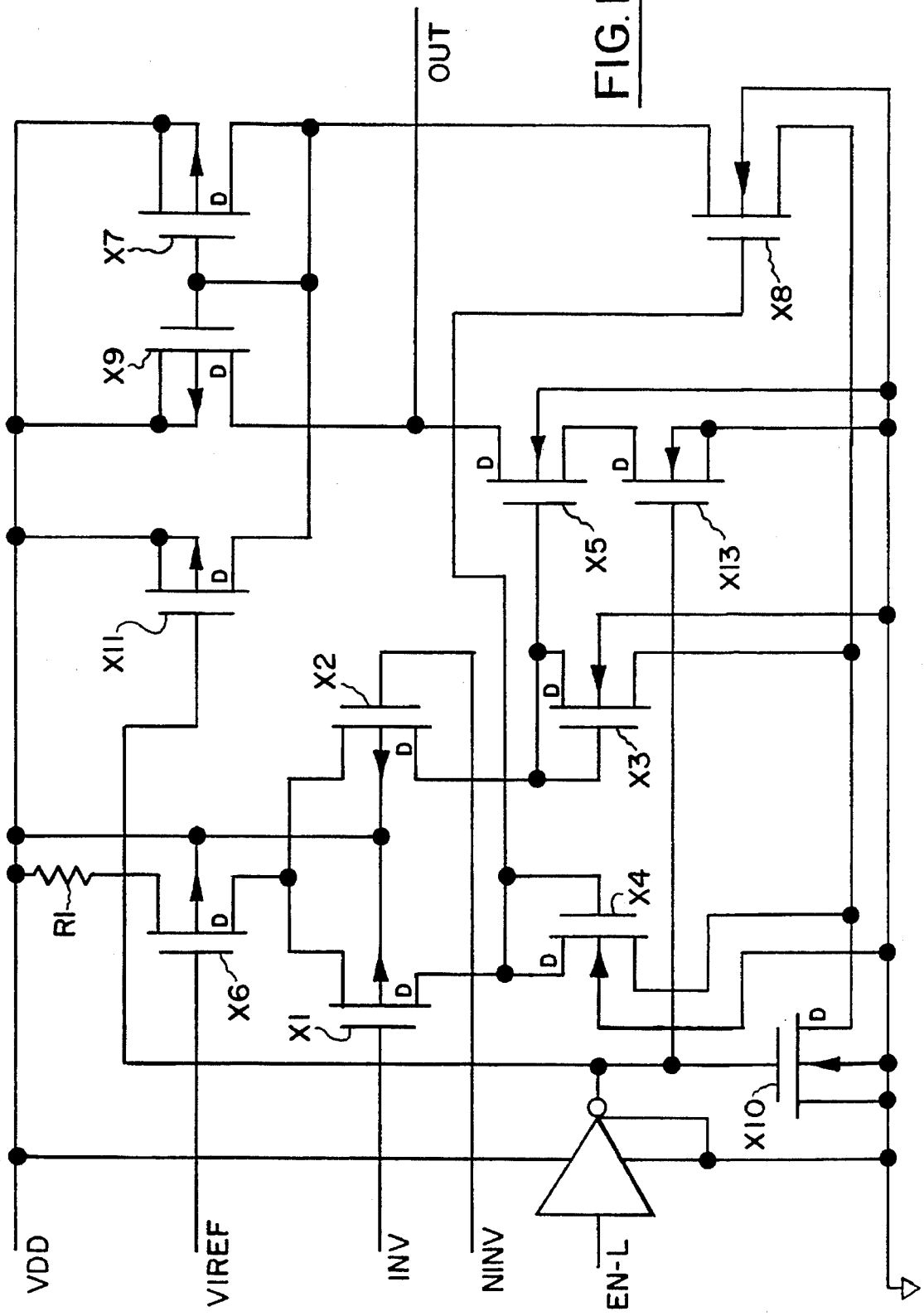
FIG. 12 is a schematic diagram of the AMP4 amplifier circuit shown in FIGS. 6, 7 and 17.
Figure 13B:
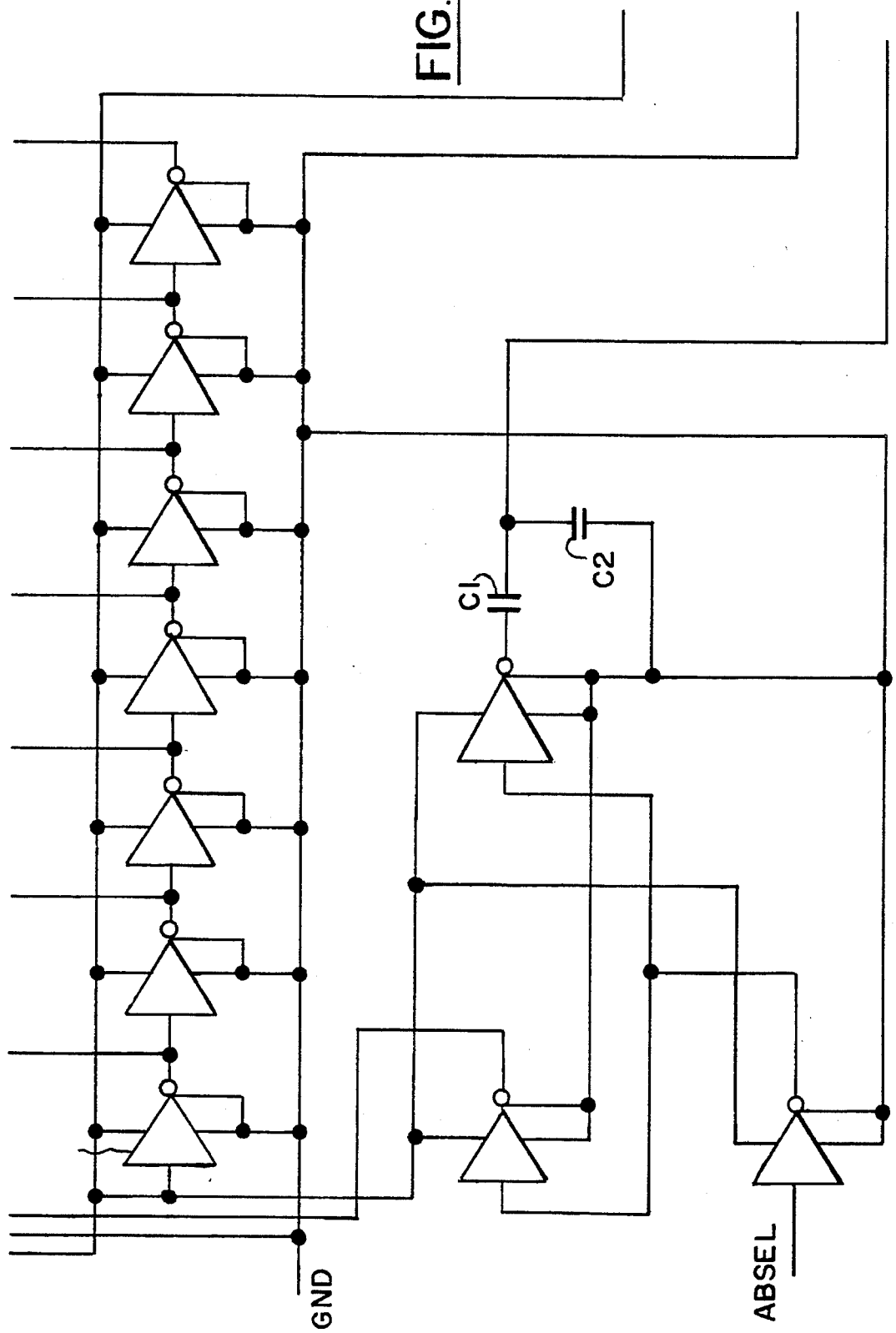
Figure 13A:
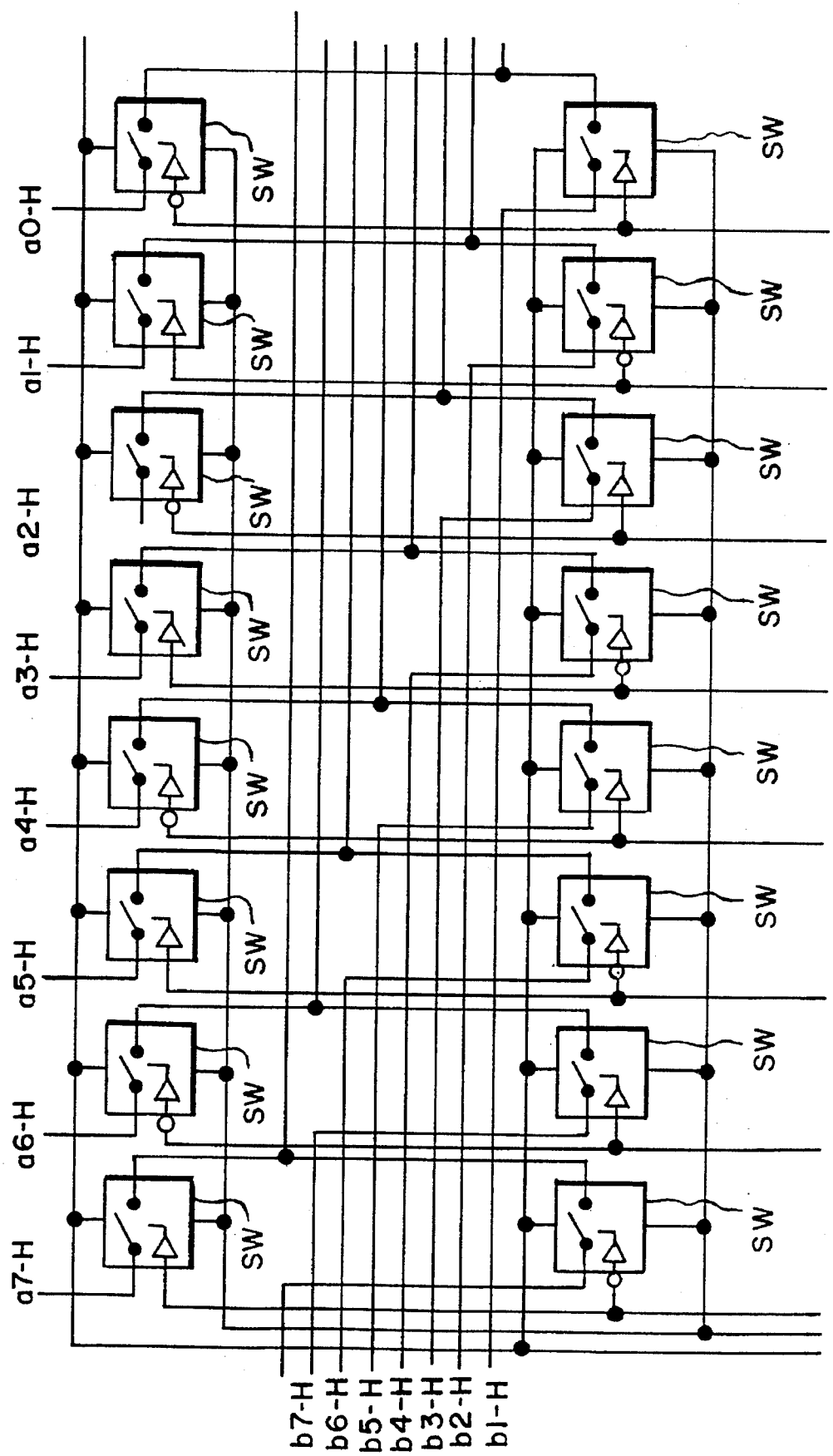
Figure 13D:
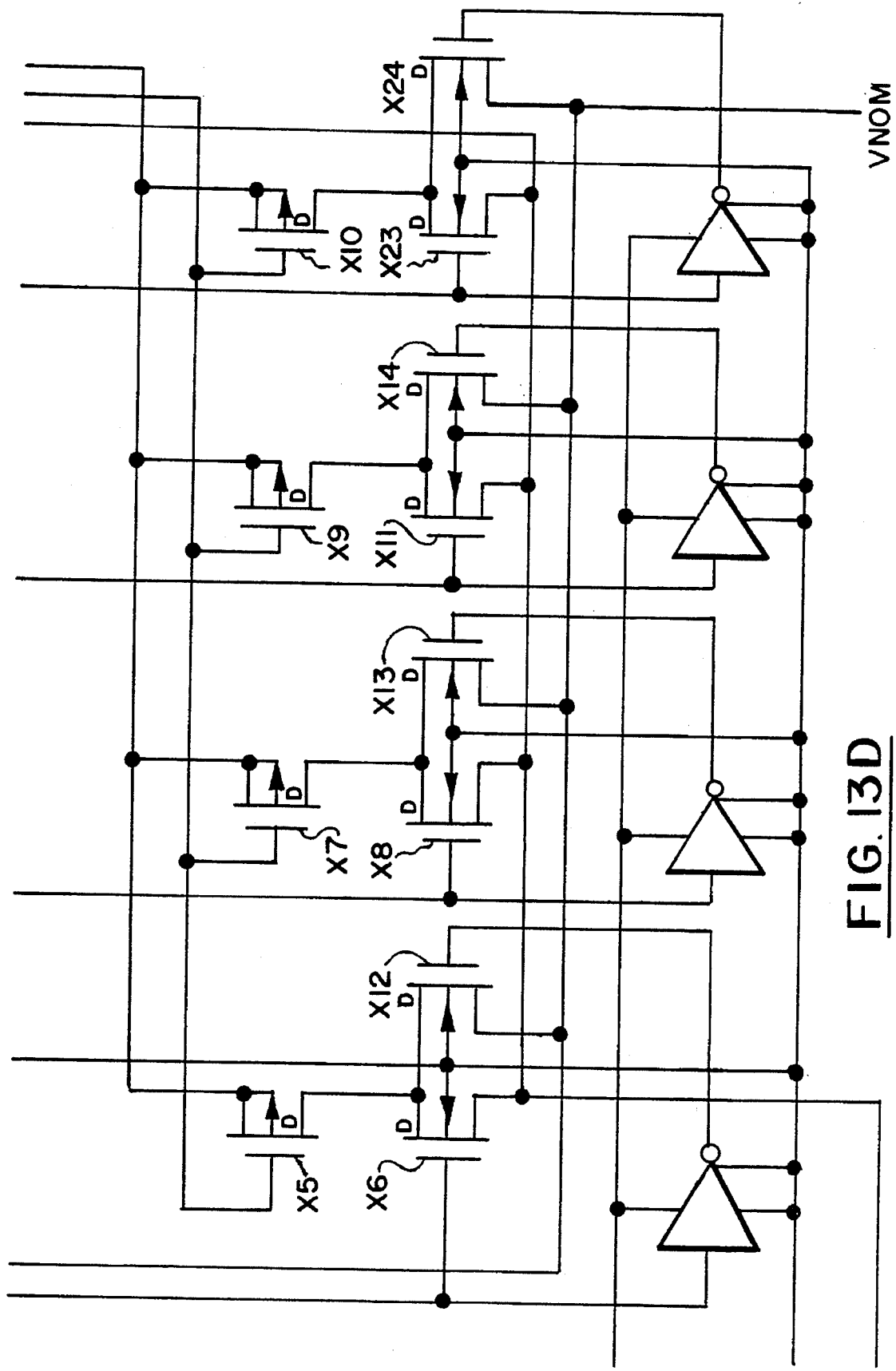

The dsreg circuit of FIG. 8 is shown in greater detail in FIG. 7. The rebuff circuit 52 is shown in FIG. 6. Both circuits use an operational amplifier, amp4 indicated at 80 in FIG. 6 which is illustrated in FIG. 12.

amp4 is a differential transconductance amplifier having a differential input stage X1, X2, X3, X4 and X6. It also has complimentary current mirrors X5 and X8 and X7, X9. The output of the amplifier is a current which is proportional to the difference between the amplifier input voltages at inv and ninv. R1 at the source of X6 provides increased output impedance (250 megohm) from the current source for the differential input. X11, X10, X13 and the inverter U1 (FIG. 11) are used to enable the amplifier and to render it in a power conservation or a sleep mode.

The dsreg circuit as shown in FIG. 7, as mentioned above, controls the drain to source voltage of the n channel FETS 42 and 43 of the H-Bridge 14. amp4 is used as an error amplifier to regulate the drain voltage of the conductive n channel bridge pass element 42 or 43 and keep it at 350 microvolts to reduce sensitivity of the threshold measurement to offset error in comparator 50. FET X1 provides a reference current through an approximately 4 kilo-ohm resistor R1 to produce a coarse voltage reference to set the regulation point. X2 is used to save operating power by turning off the reference current when the H-Bridge is not in use.

Referring to FIG. 6, rebuff 52 is a voltage follower which controls the voltage at the drain of FET X1 (81) to within 10 millivolts of the voltage at vref. The "IS" signal is connected to vnom of thrsel 47 as shown in FIG. 2 and prevents the current sources in thrsel 57 that are not used to charge to Vdd. Thus, "IS" is maintained at the nominal threshold voltage. EN-L conserves power by turning on X2, which turns off X1. EN-L also turns off the bias current in amp4 80.

The general purpose circuit iref 54 is shown in FIG. 5. It uses vamp, which is illustrated in FIGS. 15 and 16. vamp is a differential FET amplifier stage with a FET bias network which provides different bias voltages which may be selected for the operation. As FIG. 15 shows, three bias voltages are used, vb1, vb2 and vb5. These are derived from the FET network which extends from Vdd to ground.

Iref 54 provides a gate drive voltage which is used by various circuits to create temperature compensated current sources. Since X1 of FIG. 5 provides Vref/Rext Amps of current, Rext is the resistance of an external resistor 108 (FIG. 1) connected to Rexr.

Resistor 108 is external of the integrated circuit chip containing the system 106. It also uses a capacitor C1 and a pmos FET X1. The input signal vref is a battery 55 or other bias voltage source (1.2 volts in this application). The capacitor C1 is provided for stability in vamp. The inverter (FIG. 11) and X2 put the circuit in the power conservation sleep mode when enable is not asserted.

Returning to FIG. 8, the switch circuits which implement the switches 30, 31, 32 and 33 in FIG. 2 are schematically shown as including inverters and switches, these switches are implemented by FETS X1 and X2 which are gate connected to different sides of the inverter depending upon whether the switch is normally on (FIG. 10) or the switch is normally off (FIG. 9) for a high level input.

The bulk current switch (bulksw) 38 and 39 are, as illustrated in greater detail in FIG. 4, are operative to monitor the voltage at the source and drain terminals of the pass element FETS 40 and 41. Since these FETS are of pmos type, the bulk switches connect the bulk of the FET (the area in which the channel is located) to the source or the drain, whichever is of higher potential. Thus, the bulk switch is a static circuit that is constantly monitoring the source and drain voltages and very quickly switches the bulk automatically to the appropriate drain or source. vdd provides a bias input to FET X6 of bulk switch 38 which is identical to switch 39. ibias is obtained from viref 54 (FIG. 2). DS1 is connected to the source of FET 41, while DS2 is connected to the drain of FET 41. The remaining FETS X1, X3, X4, X5, X7 and X8 sense DS1 and DS2 for which has the greater magnitude and connects the bulk to the terminal of the greater magnitude. X6 receives the current reference at its i bias input. This current reference is mirrored in X7 and X9. X8 and X9 provide another current mirror. The bulk switch 38 and 39 is also described and is claimed in concurrently filed U.S. patent application Ser. No. 08/353,421 of Scott Grodevant which is assigned to the assignee hereof.

From the foregoing description it will be apparent that there has been provided an improved control system for controlling and regulating current through the drive coil of a motor and particularly a motor which oscillates an optical scanner to scan a laser beam. The system also enables the velocity and, therefore, the scan angle and direction of oscillation to be monitored to maintain a desired scan angle and motor velocity. The various control circuits which make the system and its circuits amenable to be implemented in integrated circuit form have been disclosed. It will be appreciated that the control system may be implemented in discrete circuits if miniaturization is not required, and that aspects of the system, including its control circuits, may be applied wherever current regulation and/or power conservation are desired. Also, modifications and variations of the system and its circuits within the scope of the invention will undoubtedly become apparent to those skilled in the art. Accordingly, the foregoing description should be taken as illustrative and not in a limiting sense.

What is claimed is:

1. A system for controlling a motor to oscillate in opposite senses and which is operative to drive an optical scan beam over a scan angle to scan a certain distance over a field of view, and which motor has a coil, said system comprising means for switching current flow direction in the coil, means for generating a selectable high current threshold and a low current threshold for the magnitude of said current flow, means for comparing said thresholds and the current flow in the coil for operating said switching means for turning the current to the coil off and on when the high and low thresholds are reached respectively to control the current in said coil thereby controlling said motor to scan said beam over said certain distance.

2. The system according to claim 1 wherein said generating means includes digital control means for generating digital values representing said thresholds.

3. The system according to claim 2 wherein said digital control means includes a computer for selecting said values.

4. The system according to claim 3 further comprising means for monitoring said scan angle for varying said values to change or counteract variations of the scan angle.

5. The system according to claim 4 wherein said monitoring means includes, means for sensing said current flow and providing an input corresponding thereto to said computer.

6. The system according to claim 1, wherein said switching means comprises a bridge across which said coil is connected.

7. The system according to claim 1 further comprising means in said current switching means for changing the direction of said current at a given scanning rate to cause said motor to produce oscillatory movement at said rate.

8. The system according to claim 1, wherein said comparing means comprises means coupled to said generating means for digitally storing the high and low current thresholds, means for converting said thresholds into analog levels, and analog comparison means for providing switching signals to said switching means when current flows reach magnitudes corresponding to said thresholds.

9. The system according to claim 8 switching means includes a first FET operative or a switch and a current sensing element and wherein said means for comparing comprises a second FET switchably connected to said first FET, said second FET having linear and non-linear operating characteristic regions and being operative in the linear region.

10. The system according to claim 9 further wherein said second FET is connected to said first FET as a mirror for reflecting a multiple of the impedance of said first FET when said second FET is operative to carry out said comparing operation thereof.

11. The system according to claim 9 wherein said comparing means further comprises means operated by said second FET and connected to said first FET for switching said first FET on and off in response to said low and high thresholds respectively.

* * * * *